United States Patent
Takayanagi et al.

(10) Patent No.: US 7,172,045 B2
(45) Date of Patent: Feb. 6, 2007

(54) MOTORTRICYCLE WITH OSCILLATION MECHANISM

(75) Inventors: Shinji Takayanagi, Saitama (JP); Yohei Makuta, Saitama (JP); Hiroyoshi Kobayashi, Saitama (JP); Masahiro Kuroki, Saitama (JP); Haruomi Sugita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 296 days.

(21) Appl. No.: 10/609,414

(22) Filed: Jul. 1, 2003

(65) Prior Publication Data
US 2004/0035628 A1 Feb. 26, 2004

(30) Foreign Application Priority Data
Jul. 5, 2002 (JP) ............................. 2002-197423
Sep. 30, 2002 (JP) ............................. 2002-287344

(51) Int. Cl.
*B62D 61/06* (2006.01)
(52) U.S. Cl. ............... 180/210; 180/215; 280/124.125; 280/124.134; 280/124.178
(58) Field of Classification Search ............... 180/210, 180/214, 213, 215, 216; 280/124.125, 124.134, 280/124.135, 124.136, 124.157, 124.162, 280/124.177, 124.178
See application file for complete search history.

(56) References Cited

U.S. PATENT DOCUMENTS

| 4,020,914 | A | | 5/1977 | Trautwein |
| 4,072,325 | A | | 2/1978 | Bright et al. |
| 4,360,224 | A | * | 11/1982 | Sato et al. ................... 280/269 |
| 4,478,305 | A | * | 10/1984 | Martin, II .................... 180/215 |
| 4,836,324 | A | * | 6/1989 | Morita et al. ............... 180/291 |
| 4,887,829 | A | * | 12/1989 | Prince ......................... 280/282 |
| 5,611,555 | A | * | 3/1997 | Vidal ........................... 280/282 |
| 6,435,522 | B1 | * | 8/2002 | Van Den Brink et al. ........................ 280/5.509 |
| 6,851,691 | B2 | * | 2/2005 | Rasidescu et al. .... 280/124.135 |

FOREIGN PATENT DOCUMENTS

| EP | 0 626 307 A1 | 11/1994 |
| JP | 59-153674 A | 9/1984 |
| JP | 64-23356 A | 1/1989 |
| WO | WO 02/44008 A2 | 6/2002 |

\* cited by examiner

*Primary Examiner*—Eric Culbreth
(74) *Attorney, Agent, or Firm*—Birch, Stewart, Kolasch & Birch, LLP

(57) ABSTRACT

A motortricycle with oscillation mechanism including left and right suspension arms respectively swingably mounted onto a vehicle body frame, rear wheels mounted respectively onto the outer portions of the left and right suspension arms. An oscillation mechanism permitting leftward and rightward oscillation of the vehicle body frame relative to the side of the suspension arms is provided between the suspension arms and the vehicle body frame, and an engine for driving the left and right rear wheels is mounted onto the vehicle body frame. Since the engine of the motortricycle is mounted on the vehicle body frame rather than on the suspension arms, weight on the suspension arms can be largely reduced, and the riding comfort can be further enhanced.

20 Claims, 21 Drawing Sheets

FIG. 8A
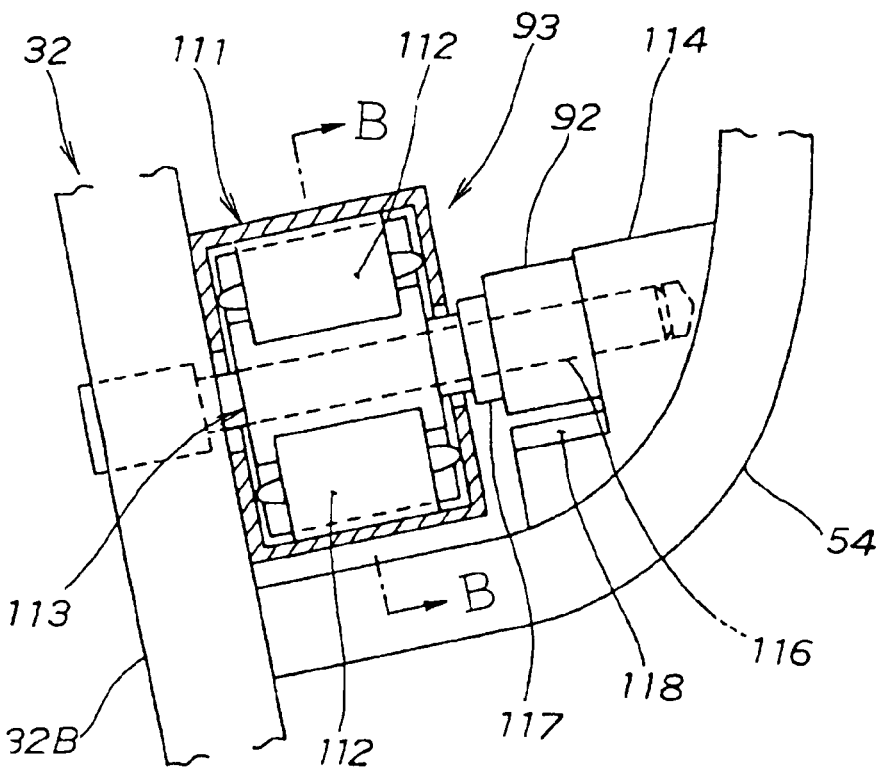
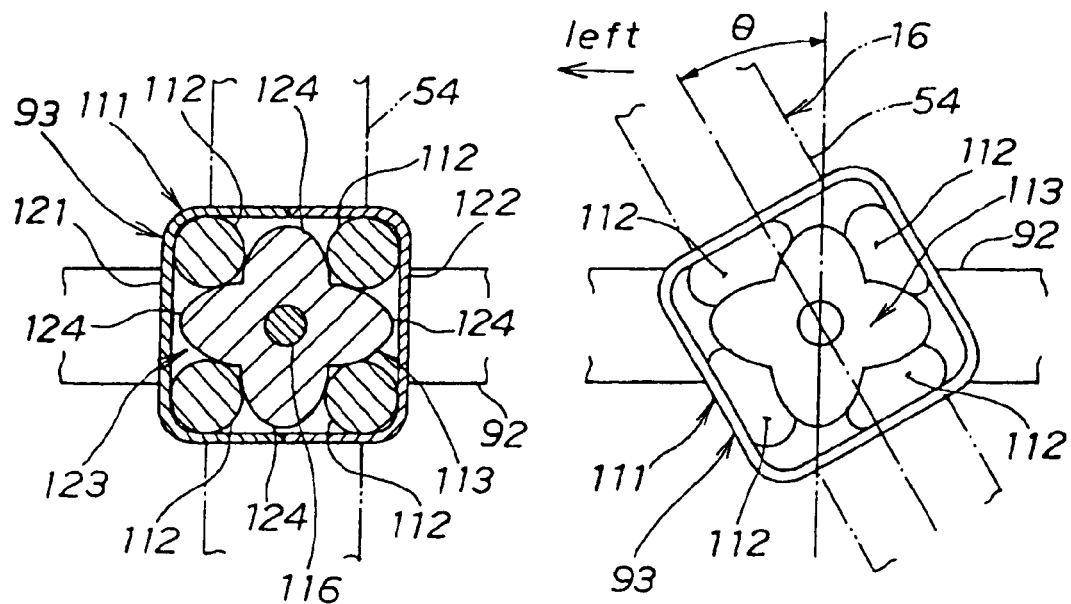
FIG. 8B    FIG. 8C

MOTORTRICYCLE WITH OSCILLATION MECHANISM

CROSS-REFERENCE TO RELATED APPLICATIONS

The present application claims priority under 35 USC 119 to Japanese Patent Application No. 2002-197423 filed on Jul. 5, 2002 and Japanese Patent Application No. 2002-287344 filed on Sep. 30, 2002, the entire contents thereof is hereby incorporated by reference.

BACKGROUND OF THE INVENTION

1. Field of the Invention

The present invention relates to a motortricycle with an oscillation mechanism, more particularly to an engine support structure and a vehicle body frame structure for supporting the engine.

2. Description of Background Art

As a motortricycle with an oscillation mechanism, those in which the engine can swing with the rear wheels have been known. For example, Japanese Patent Laid-open No. Sho 59-153674 and Japanese Patent Publication No. Hei 1-23356 have been known. The contents of Japanese Patent Laid-open No. Sho 59-153674 will be described below referring to FIG. 18, and the contents of Japanese Patent Publication No. Hei 1-23356 will be described below referring to FIG. 19.

A vehicle body frame for a vehicle, is known wherein a driving device support frame has a substantially box shape for seated type four-wheel buggy car. For example, Japanese Utility Model No. 2521705 has been known. The contents of Japanese Utility Model No. 2521705 will be described below referring to FIG. 20 and FIG. 21.

FIG. 18 shows a motortricycle in which a connection shaft 203 is mounted onto a rear portion of a front frame 201 through a bracket plate 202, a drum 204 is turnably mounted onto the connection shaft 203, a back tube 205 is attached to the drum 204, an engine unit 207 is mounted onto the back tube 205 through a support shaft 206, left and right rear wheels 208 are mounted onto rear portions of the engine unit 207, and a shock absorber 211 is disposed bridgingly between the engine unit 207 and the rear end of the back tube 205.

Both the engine unit 207 and the rear wheels 208 are vertically movable relative to the back tube 205. With this structure, there arises no problem in the case of a vehicle having a comparatively small displacement. However, in the case of high-speed running of a vehicle having an intermediate to large displacement, the weight under the spring 211 will be large. Therefore, in this situation, it is difficult for the rear wheels 208 to follow the surface of a very rough road on which the vehicle is running.

FIG. 19 shows a motortricycle 226 in which an oscillation joint 218 is vertically movably mounted onto a rear portion of a front vehicle body including a front wheel 215 through a pin 217, a rear frame 222 constituting an essential part of a rear vehicle body 221 is attached to a rear portion of the oscillation joint 218, Further, an engine 223 is mounted onto the rear frame 222, and left and right rear wheels 225 are mounted onto an output shaft of a transmission case 224 provided integrally with the engine 223.

In the motortricycle 226, since the engine 223 is mounted onto the rear frame 222 swingably mounted onto the front vehicle body 216, the under-spring weight will be large. Therefore, in the same manner as in the case of the motortricycle shown in FIG. 18, it is difficult for the rear wheels 225 to follow up to the ruggedness of the ground surface in the case of a vehicle having an intermediate to large displacement.

As shown in FIG. 20, a seat mount frame 231 L-shaped in side view is mounted onto a rear portion of a main frame 230, an engine support frame 232 L-shaped in side view is mounted onto the rear end of the main frame 230, the rear end of the seat mount frame 231 is attached to a front portion of the engine mount frame 232, and an intermediate portion of the engine support frame 232 is supported by a slant frame 233 extended rearwardly upwards from the rear end of the main frame 231. Further, a rear frame 234 roughly L-shaped in side view is attached to the rear end of the engine support frame 232, a lower frame 235 is arranged bridgingly between the front end of the rear frame 234 and a lower portion of the slant frame 233, and an engine 236, a non-stage speed change type belt converter transmission 237, and a differential gear 238 are surrounded by the main frame 230, the seat mount frame 231, the engine support frame 232, the rear frame 234, and the lower frame 235.

FIG. 21 shows the condition where the lower frame 235 roughly V-shaped in plan view is arranged bridgingly between left and right L-shaped pipes 241, 241 constituting the engine support frame 232, rear swing arms 242, 242 are swingably attached to the lower frame 235 through brackets 243, 243, and rear wheels 244, 244 are disposed on the end portion sides of the rear swing arms 242, 242.

In the above-mentioned prior art of FIG. 20 and FIG. 21, for example, the engine support frame 232 has a structure in which the L-shaped pipes 241, 241 disposed on the left and right sides are connected by a plurality of cross members, so that the weight thereof will be large although the rigidity thereof will be high. If a reduction in weight can be contrived while securing the rigidity for supporting the engine 236 and other power transmission mechanisms, the inertial weight of a rear portion of the vehicle body frame can be reduced.

In addition, when the L-shaped pipes 241, 241 are disposed on the left and right sides, the vehicle width is enlarged. For example, where the above buggy car is a vehicle having such a structure as to permit large oscillations to the left and right sides, the L-shaped pipes 241, 241 are liable to interfere with the rear swing arms 242, 242 upon oscillations to the left and right sides. Therefore, the rear swing arm 242 must, for example, be curved largely so as to obviate the interference with the L-shape pipe 241, so that the total length thereof is increased, resulting in an increase in weight.

SUMMARY AND OBJECTS OF THE INVENTION

In view of the above, it is an object of the present invention to provide a motortricycle with oscillation mechanism enhanced in riding comfort even if an engine with a comparatively large displacement is mounted thereon, and so as to reduce weight while securing the rigidity of the vehicle body frame for supporting an engine and the like. In particular, an objective is to reduce the inertial weight of a rear portion of the vehicle body frame and, further, reduce the weight of suspension arms.

In order to attain the above object, according to an aspect of the present invention, an oscillation mechanism is provided for a motortricycle wherein left and right suspension arms are respectively swingably mounted onto a vehicle body frame, rear wheels are mounted respectively onto the tip ends of the left and right suspension arms, an oscillation mechanism permitting leftward and rightward oscillation of the vehicle body frame relative to the suspension arm side is provided between the suspension arm side and the vehicle body side, and an engine for driving the left and right rear wheels is mounted onto the vehicle body frame. As a result, the engine can oscillate together with the vehicle body frame.

In the above-mentioned motortricycle with an oscillation mechanism, the rear wheels are mounted onto the vehicle body frame through the suspension arms, and the engine is mounted onto the vehicle body frame. Therefore, when a suspension spring is attached to the suspension arm side, the engine is not present on the suspension arm side, so that the under-spring weight can be reduced greatly, and riding comfort can be further enhanced.

According to another aspect of the present invention, the engine is preferably supported on the vehicle body frame through a rubber mount. In the motortricycle, preferably the rubber mount makes it difficult for vibration to be transmitted from the engine to the vehicle body frame, and also restrains generation of noise.

According to another aspect of the present invention, the engine is preferably supported on the vehicle body frame through a plurality of links. With the links made different in length, the links differ in resonance frequency due to the difference in length, so that the vibration transmitted from the engine to the vehicle body frame can be reduced.

According to another aspect of the present invention, the vehicle body frame may surround the front and rear sides and the upper and lower sides of the engine. At least a rear portion of the vehicle body frame is composed of a single pipe.

Since the vehicle body frame surrounds the front and rear sides and the upper and lower sides of the power unit, the rigidity of the vehicle body frame can be enhanced, as compared, for example, with a structure in which a vehicle body frame is extended in the manner of cantilevers on the left and right sides on the upper side of a power unit.

In addition, since at least a rear portion of the vehicle body frame is composed of a single pipe, the inertial weight of the rear portion of the vehicle body frame can be reduced, whereby turning performance of the motortricycle can be enhanced.

Further, since the size in the vehicle width direction of the rear portion of the vehicle body frame can be reduced, even where the vehicle body frame, particularly in a motortricycle with an oscillation mechanism, is largely oscillated to the left and right sides and the suspension arms are moved vertically, sufficient clearances can be secured between the vehicle body frame and the suspension arms. Therefore, the suspension arms need not be curved largely for obviating interference with the vehicle body frame, the total length of the suspension arms can be reduced, and the weight of the suspension arms can be reduced.

According to the further aspect of the present invention, the single pipe of the rear portion of the vehicle body frame may be connected to a front frame through a Y-shaped branch portion on the upper side and/or the lower side of the engine. The front frame and the single pipe of the rear portion of the vehicle body frame can be firmly connected to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A to 8C are illustrations showing a structure and function of the oscillation mechanism according to the first embodiment, in which FIG. 8A is a side view of the oscillation mechanism according to the first embodiment, FIG. 8B is a sectional view taken on line B—B of FIG. 8A, and FIG. 8C is a function diagram of the oscillation mechanism according to the first embodiment;

DETAILED DESCRIPTION OF THE PREFERRED EMBODIMENTS

Figure 1:
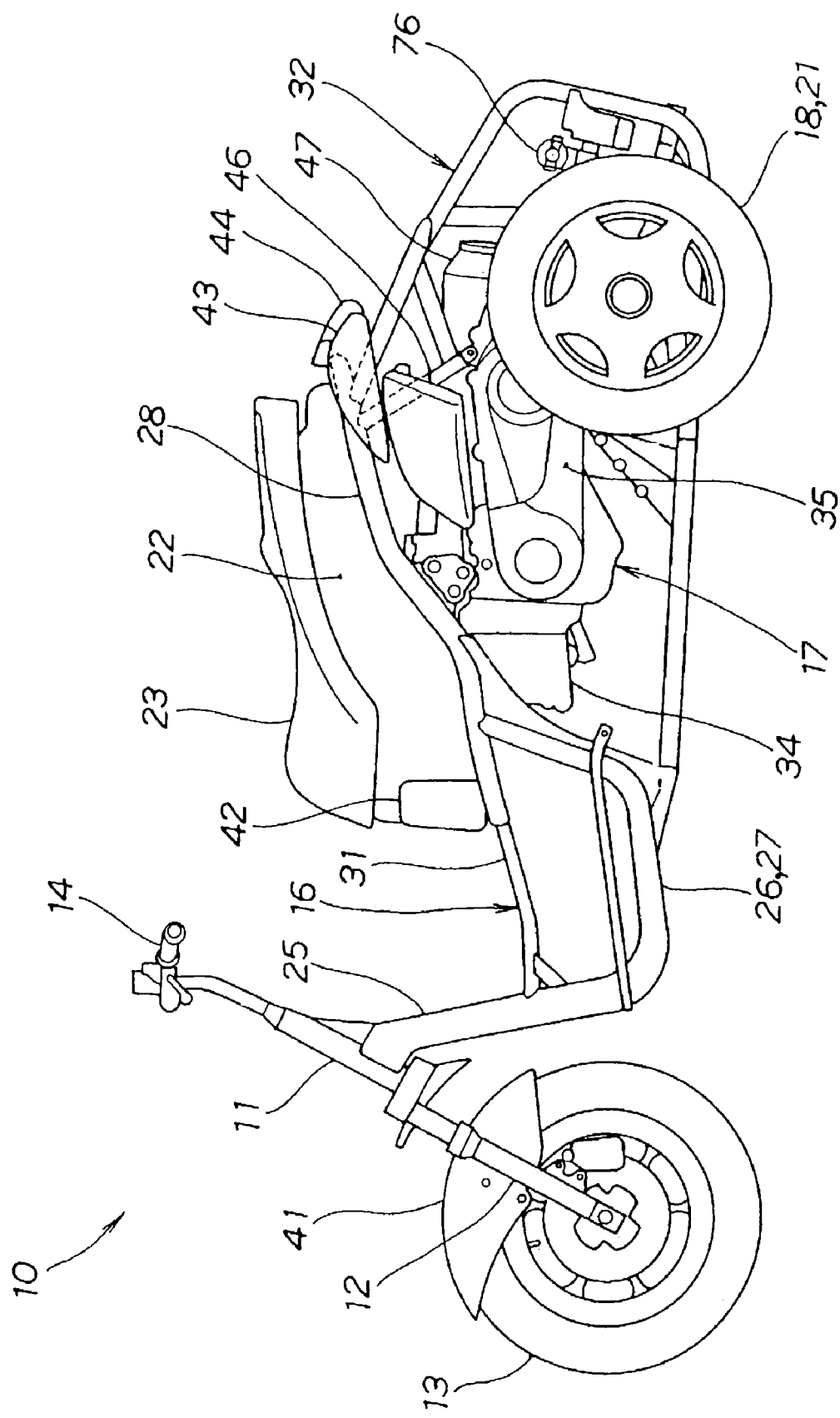
FIG. 1 is a side view of a motortricycle with oscillation mechanism according to the first embodiment of the present invention.

Referring to FIG. 1, the motortricycle with an oscillation mechanism 10 (hereinafter referred to as "motortricycle 10") includes a front fork 12 steerably mounted onto a head pipe 11 through a handle shaft not shown, a front wheel 13 mounted onto the lower ends of the front fork 12, a handle 14 integrally attached to the front fork 12, a vehicle body frame 16 attached to a rear portion of the head pipe 11, a power unit 17 mounted onto a rear portion of the vehicle body frame 16, left and right rear wheels 18 and 21 driven by the power unit 17, a luggage box 22 mounted onto an upper portion of the vehicle body frame 17, and a seat 23 openably and closably mounted onto an upper portion of the luggage box 22.

The vehicle body frame 16 includes a down pipe 25 extended rearwardly downward from the head pipe 11, a left-right pair of lower pipes 26 and 27 extended rearwardly from a lower portion of the down pipe 25 and then extended rearwardly upwards, a center upper frame 28 connected to rear portions of the lower pipes 26 and 27, a center pipe 31 extended rearwards from the down pipe 25 and connected to the center upper frame 28, and a J frame 32 J-shaped in side view connected to rear portions of the lower pipes 26 and 27 and to the rear portion side of the center upper frame 28.

The center upper frame 28 is a member for supporting the luggage box 22 and for hanging the power unit 17.

The J frame 32 is a member for mounting a rear suspension for suspending the rear wheels 18 and 21 and for mounting an oscillation mechanism permitting leftward and rightward oscillation of the vehicle frame 16 side relative to the rear suspension side. The rear suspension and the oscillation mechanism will be described in detail later.

The power unit 17 includes an engine 34 disposed on the front side of the vehicle body, and a power transmission mechanism 35 for transmitting the power of the engine 34 to the rear wheels 18 and 21.

Also shown are a front fender 41 for covering the upper side of the front wheel 13, a battery 42, a signal light 43, a tail lamp 44, an air cleaner 46, and a muffler 47.

Figure 2:
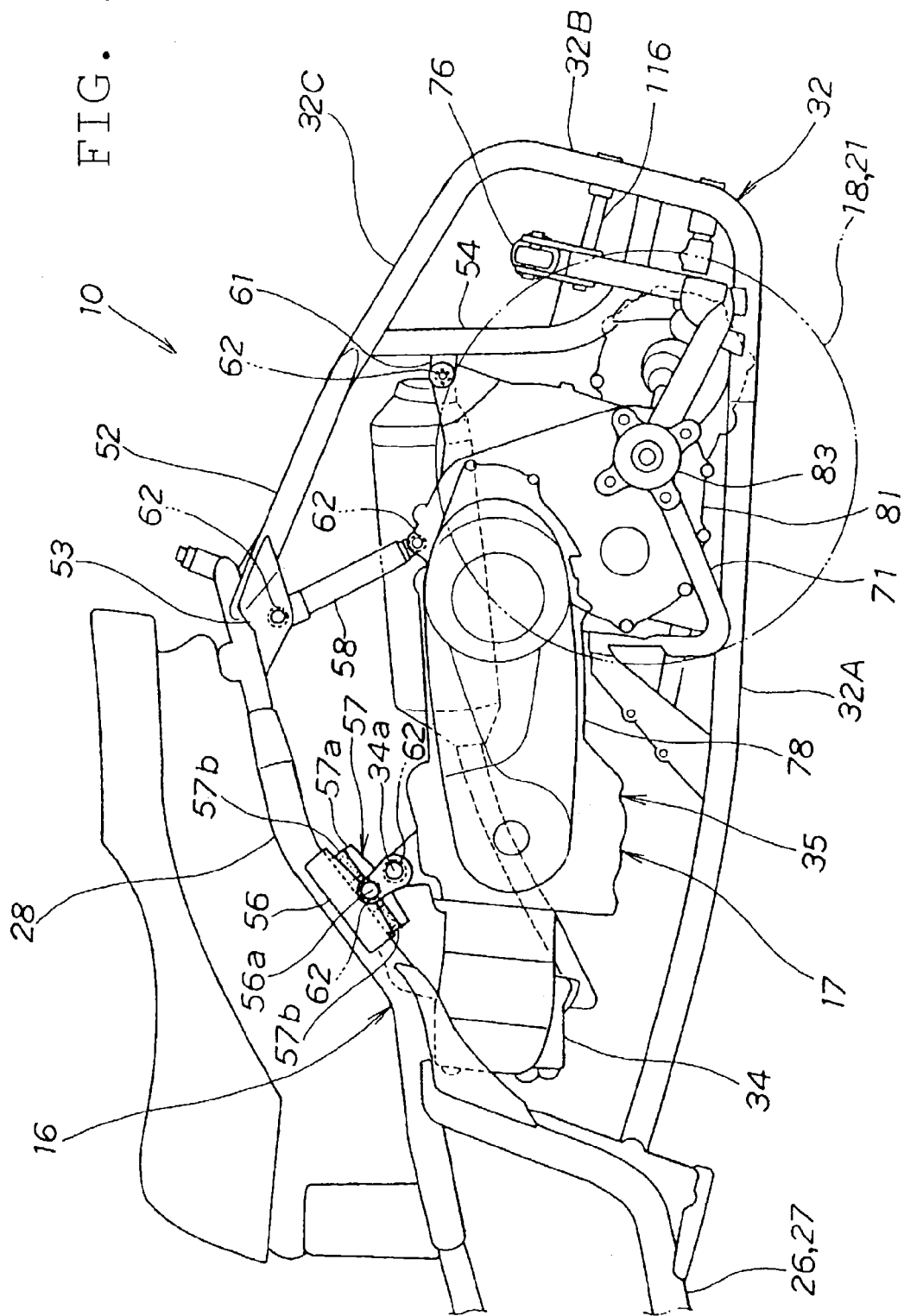
FIG. 2 is a side view of an essential part of the motortricycle according to the first embodiment.

FIG. 2 shows the condition where connection pipes 52, 52 (the connection pipe 52 on the other side is not shown) bridgingly disposed between the J frame 32 and the center upper frame 28 so as to connect an upper portion of the J frame 32 and the rear end of the center upper frame 28 to each other, reinforcing plates 53, 53 are attached to the connection pipes 52, 52 and the center upper frame 28, and an L pipe 54 L-shaped in side view is attached to the inner side of a rear portion of the J frame 32. Brackets 56, 56 (the bracket 56 on the other side is not shown) are attached to the center upper frame 28, a front upper portion of the power unit 17 is attached to the brackets 56, 56 through a relay member 57, a support rod 58 is extended rearwardly downwards from the reinforcing plates 53, 53 so as thereby to support a rear portion of the power unit 17, and a projection portion 61 is extended forwards from a front portion of the L pipe 54 so as thereby to attach a rear end portion of the power unit 17. The relay member 57 functions as a link for connecting the brackets 56, 56 with the power unit 17. The supports rod 58 functions as a link for connecting the reinforcing plates 53, 53 with the power unit 17. Incidentally, symbols 32A, 32B, and 32C denote a lower horizontal portion set to be substantially horizontal, a rear end slant portion with its upper end side moved to the rear side than its lower end side, and an upper slant portion with its front end side moved to the upper side than its rear end side, respectively, of the J frame 32.

The relay member 57 is composed of a main body portion 57a oscillatably mounted onto the side of the engine 34 through a support shaft 34a and oscillatably mounted onto the sides of the brackets 56, 56 through a support shaft 56a, and stopper rubbers 57b, 57b mounted onto the main body portion 57a so as to be brought into contact with the lower surface of the center upper frame 28.

Rubber bushes 62, are respectively provided between the support shaft 34a and the side of the engine 34, between the support shaft 56a and the bracket 56, between the support rod 58 and the reinforcing plate 53, between the support rod 58 and a non-stage transmission 78, and at a connection portion between a gear box 81 and the L pipe 54.

Figure 3:
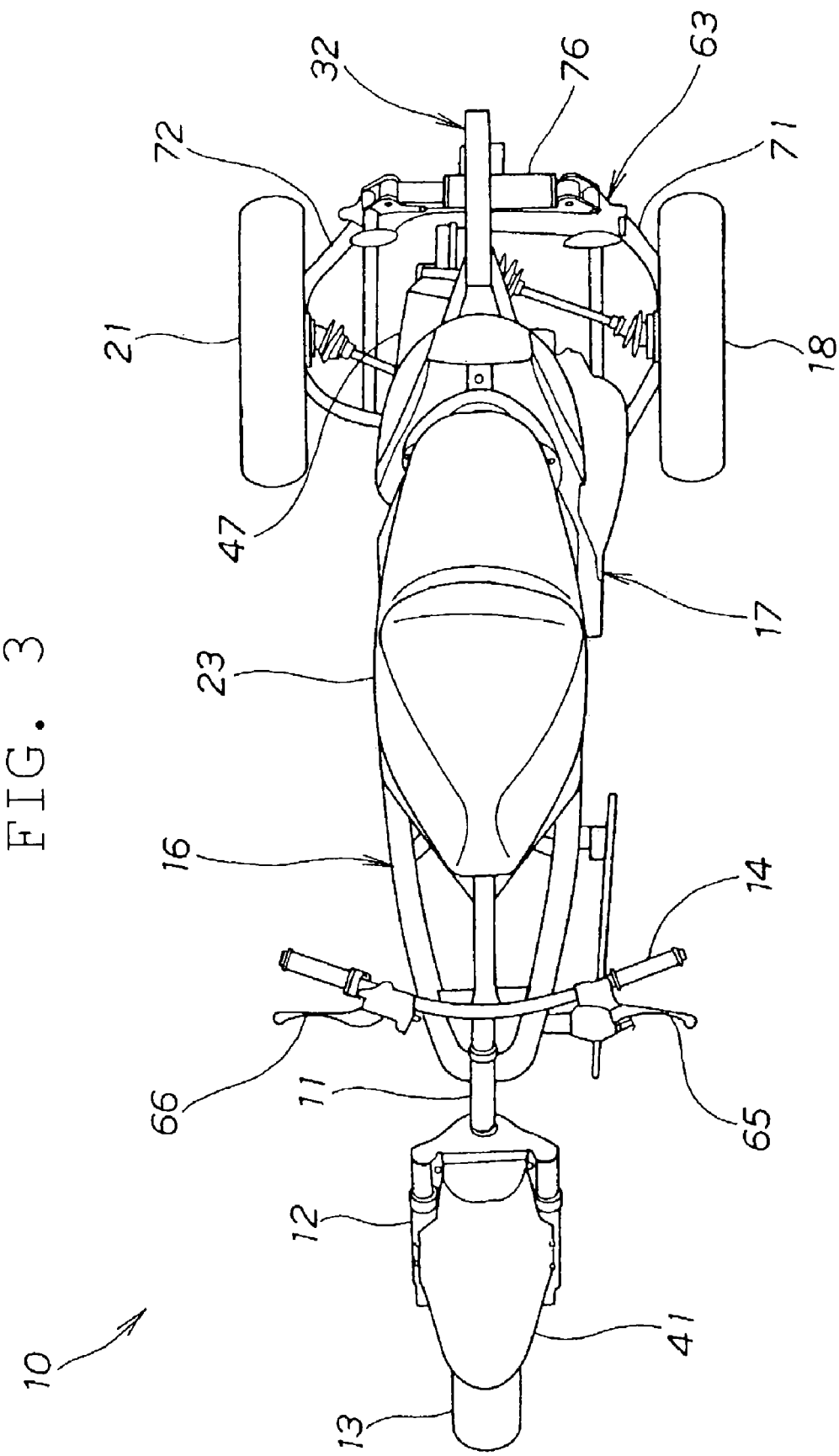
FIG. 3 is a plan view of the motortricycle according to the first embodiment.

FIG. 3 shows the condition where a rear portion of the J frame 32 is constituted of a single pipe, and the rear suspension 63 (details will be described later) is attached to the J frame 32. Also shown are a brake lever 65 for the rear wheels, and a brake lever 66 for the front wheels.

Figure 4:
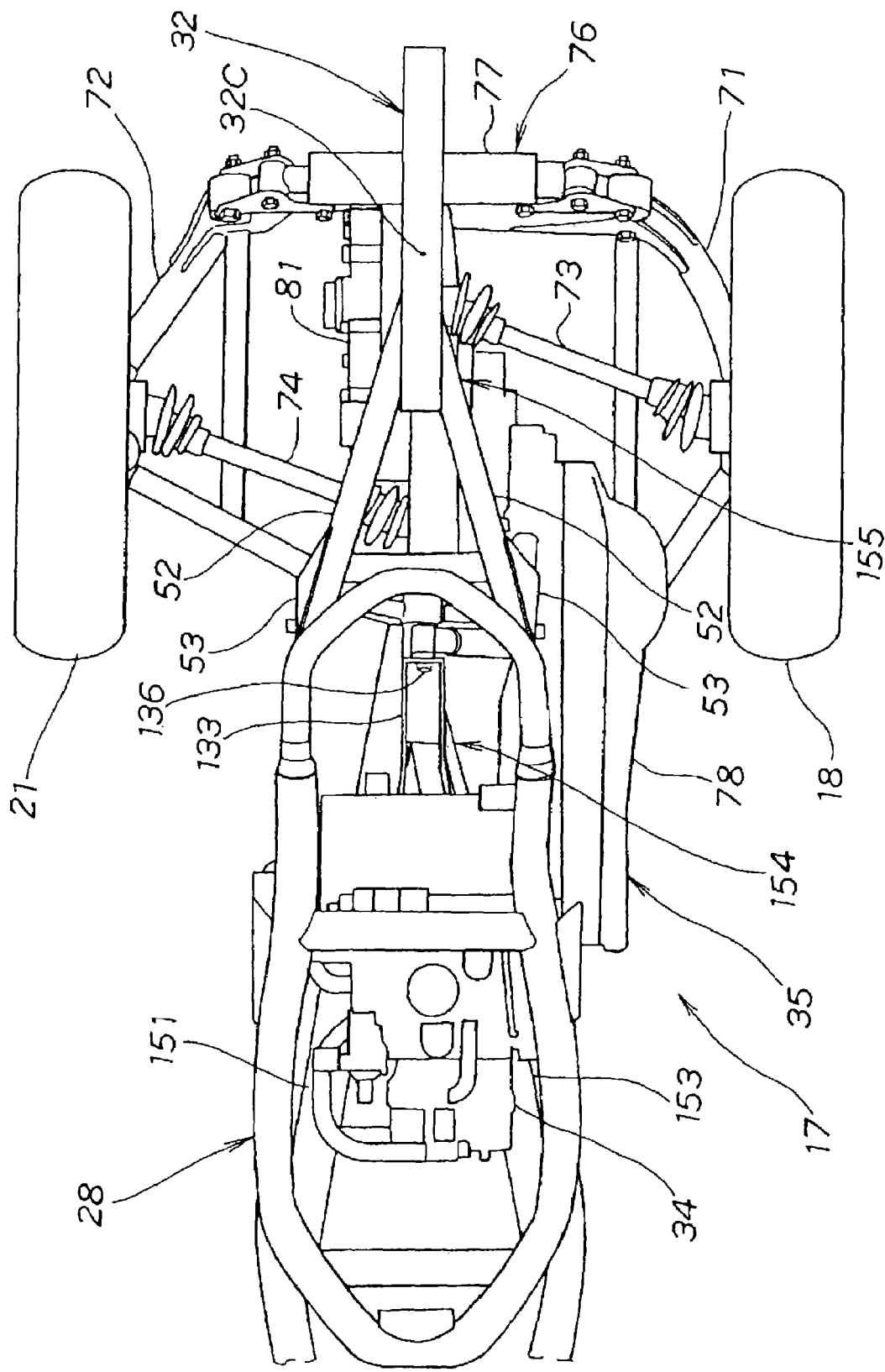
FIG. 4 is a plan view of an essential part of the motortricycle according to the first embodiment.

FIG. 4 shows a structure in which suspension arms 71 and 72 are attached to left and right portions of the J frame 32, holders (not shown) are attached respectively to the tip ends of the suspension arms 71 and 72, the rear wheels 18 and 21 are rotatably mounted on the holders, and the rear wheels 18 and 21 are driven by drive shafts 73 and 74 extended from the power transmission mechanism 35 of the power unit 17.

Symbol 76 denotes a shock absorber composed of a damper 77 and a compression coil spring (not shown) and is connected to the sides of the left and right suspension arms 71 and 72.

The center upper frame 28 is a member having substantially elliptic shape, and the luggage box 22 (see FIG. 1) having a bottom with substantially the same shape is mounted on an upper portion thereof.

The power transmission mechanism 35 of the power unit 17 includes a belt type non-stage speed change gear 78 extended rearwards from a left rear portion of the engine 34, and a gear box 81 connected to a rear portion of the non-stage speed change gear 78. The drive shaft 74 is connected to an output shaft on the front side of the gear box 81, whereas the drive shaft 73 is connected to an output shaft on the rear side of the gear box 81.

Figure 5:
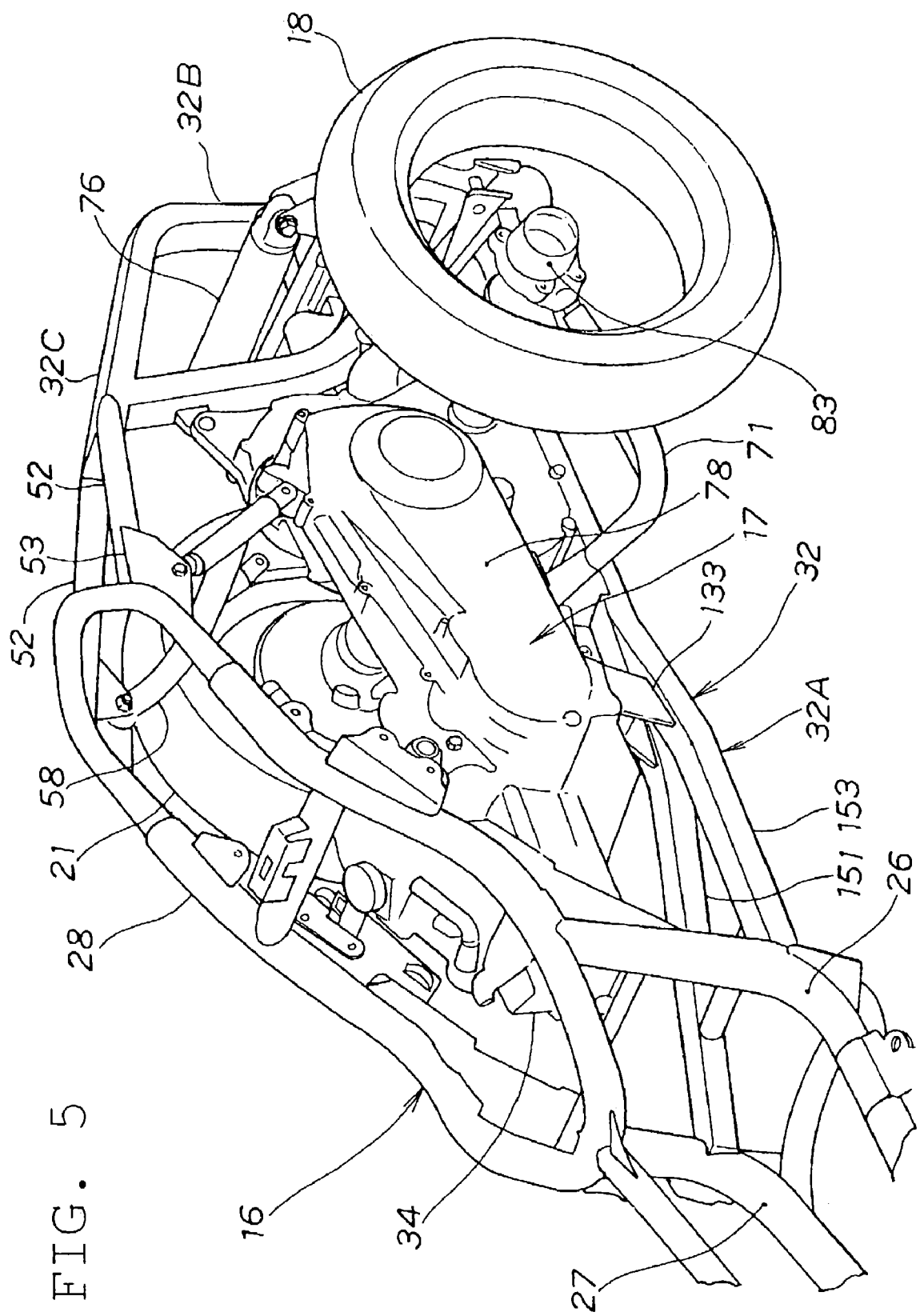
FIG. 5 is a perspective view of a vehicle body frame structure of the motortricycle according to the first embodiment.

FIG. 5 shows the condition where a front portion of the J frame 32 is attached to rear portions of the lower pipes 26 and 27 of the vehicle body frame 16. Incidentally, symbol 83 denotes the holders (the holder 83 on the other side is not shown).

Figure 6:
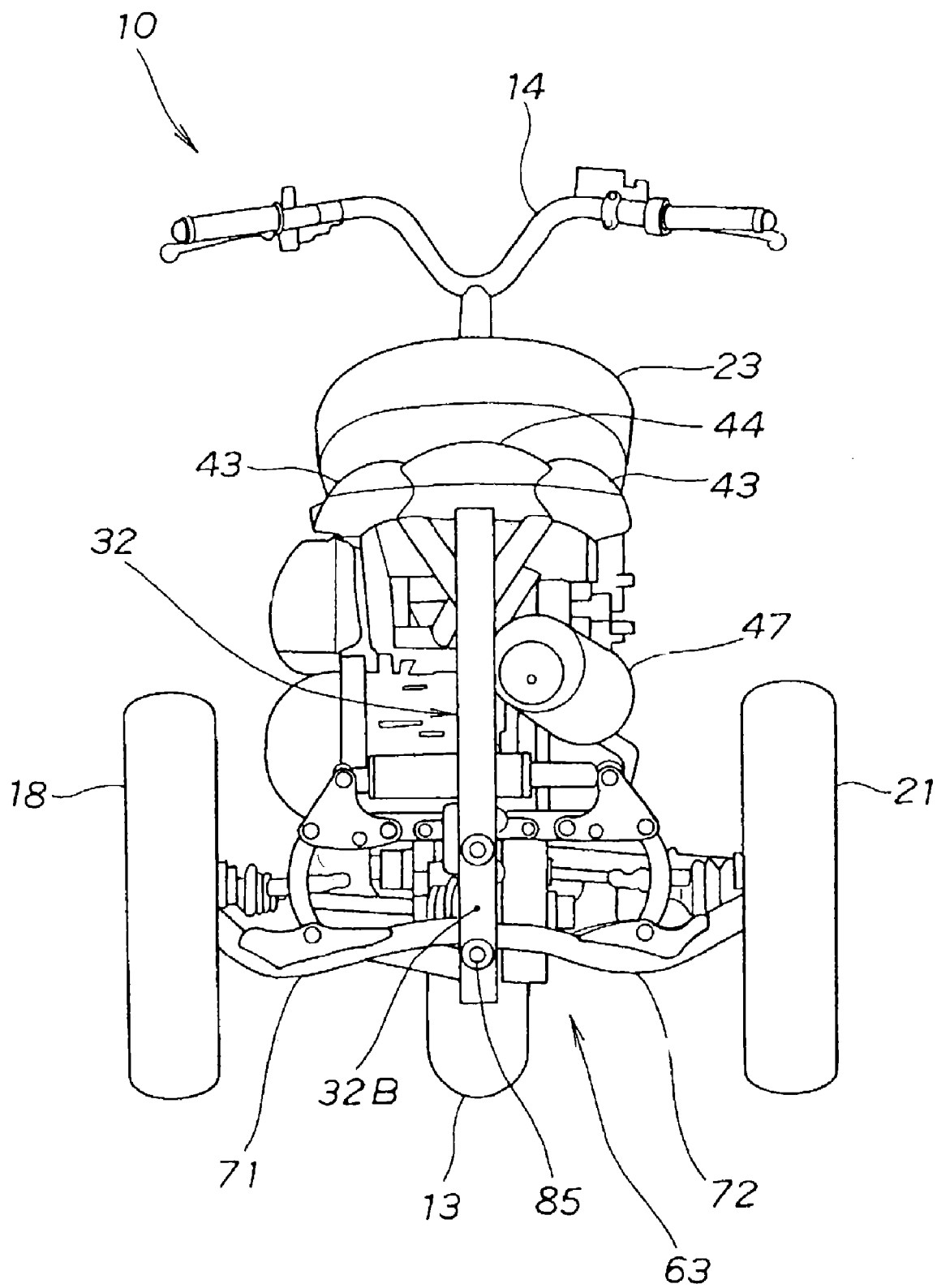
FIG. 6 is a back elevation of the motortricycle according to the first embodiment.

As shown in FIG. 6, the rear end slant portion 32B of the J frame 32 is a portion set substantially vertical in the condition where the rider is not seated on the motortricycle 10, and rear portions of the suspension arms 71 and 72 are attached to the rear end slant portion 32B. Incidentally, a rear swing shaft 85 is provided for swingably mounting the rear portions of the suspension arms 71 and 72 onto the rear end slant portion 32B.

Figure 7:
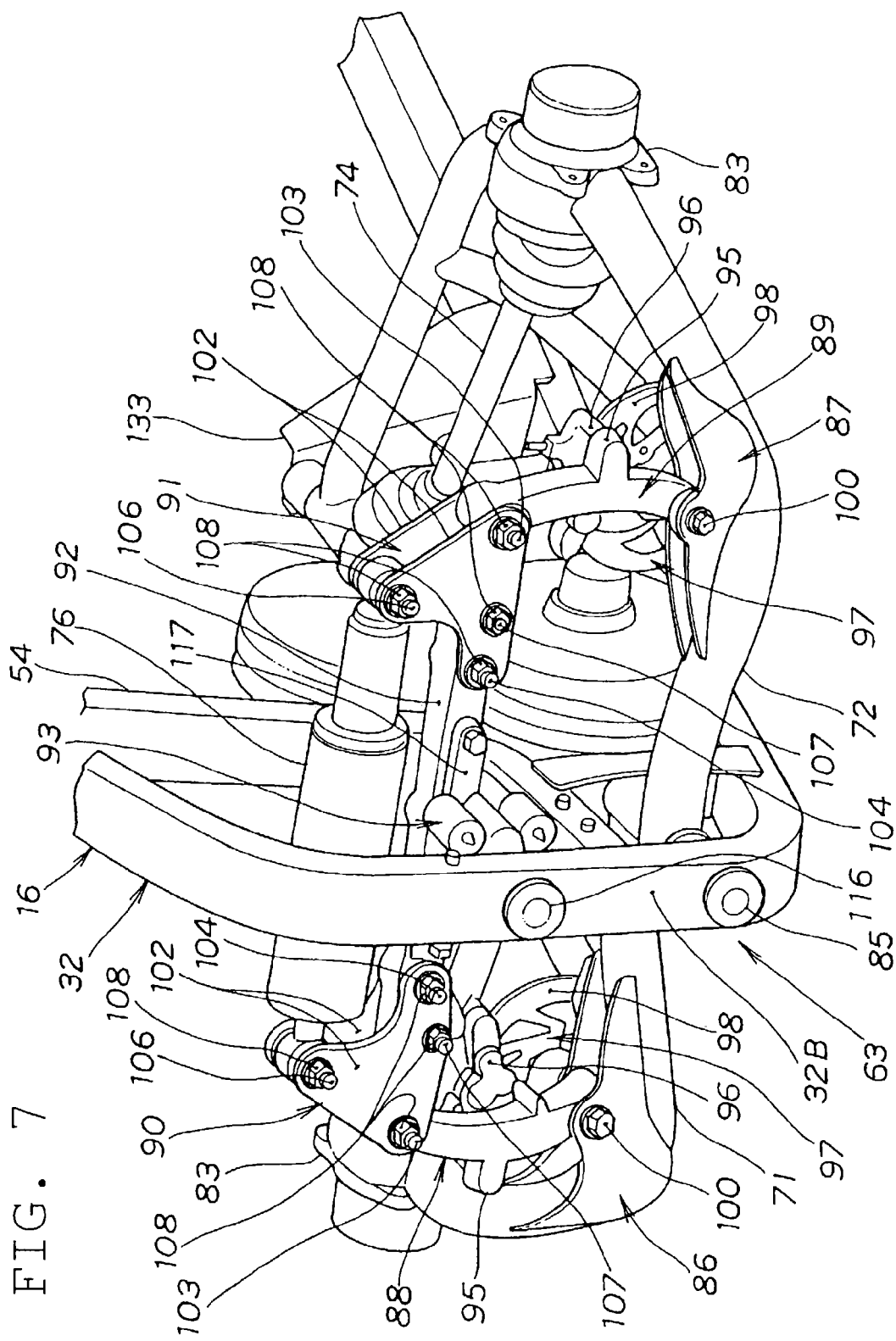
FIG. 7 is a perspective view of a rear portion of the vehicle body structure of the motortricycle according to the first embodiment.

FIG. 7 shows the rear suspension 63 in which the suspension arms 71 and 72 are extended leftwards and rightwards from the J frame 32, the holders 83 are attached respectively to the tip ends of the suspension arms 71 and 72, arcuate links 88 and 89 are swingably mounted onto upper portions of the suspension arms 71 and 72 through mount brackets 86 and 87, and bell cranks 90 and 91, which are roughly L-shaped in side view and which functions as a connecting means, are swingably mounted onto the tip ends of the arcuate links 88 and 89. The shock absorber 76 is bridgingly disposed between upper end portions of the bell cranks 90 and 91, a connection member 92 in the shape of a bar is bridgingly disposed between side end portions of the bell cranks 90 and 91, and the connection member 92 is attached to the rear end slant portion 32B of the J frame 32 through the oscillation mechanism 93.

The arcuate links 88 and 89 are members each including a side projection portion 95 at an intermediate portion thereof, and brake devices 97,97 for braking the swinging of the arcuate links 88 and 89 are attached to the side projection portions 95. Incidentally, brake devices 97, 97 each include a brake caliper 96, with disks 98, 98 clamped between the brake calipers 96, 96 by a hydraulic oil pressure. The disks 98, 98 are members attached respectively to the suspension arms 71 and 72. A bolt 100 functions as a swing shaft for the arcuate links 88 and 89.

The bell clamps 90 and 91 are each composed of two crank plates 102, 102, and each include a first bolt 103, a second bolt 104, and a third bolt 106. Incidentally, symbol 107 denotes a fourth bolt used as a stopper pin for restricting the stretching and shrinking of the shock absorber 76 and the swinging of the connection member 92. Nuts 108 are screw-engaged with the first to fourth bolts 103 to 107.

The oscillation mechanism 93 permits leftward and rightward oscillation of the vehicle body frame 16 relative to the suspension arms 71 and 72 at the time of cornering and the like. As the oscillation inclination increases, a reaction force is increased by an elastic element incorporated therein so as to return the vehicle body frame 16 to an original position.

As shown in FIG. 8A, the oscillation mechanism 93 is the so-called "Neidhard damper" including a case 111 attached to the rear end slant portion 32B of the J frame 32 and a rear portion of the L pipe 54, damper rubbers 112 contained in the case 111, a pressing member 113 pressing the damper rubbers 112 and attached to the connection member 92, and a penetrating pin 116 penetrating through the pressing member 113 and the connection member 92 and having both end portions supported by a tip end support portion 114 provided in the L pipe 54 and the rear end slant portion 32B. A mount portion is provided in the pressing member 113 for mounting the pressing member 113 onto the connection member 92 by a bolt, and a swing restricting portion 118 is provided integrally on the tip end support portion 114 for restricting the swinging amount of the connection member 92.

As shown in FIG. 8B, the case 111 includes a left case 121 and a right case 122 mated with each other, a damper containing chamber 123 is provided therein, the damper rubbers 112 are disposed in four corners of the damper containing chamber 123, and the damper rubbers 112 are pressed by projected form pressing portions 124 of the pressing member 113.

In FIG. 8C, when the vehicle body frame 16 is oscillated to the left side of the vehicle body (arrow "left" in the figure indicates the left side of the vehicle body) relative to the connection member 92 connected to the suspension arm side and the L pipe 54 is inclined by an angle, θ (theta) the case 111 of the oscillation mechanism 93 is rotated relative to the pressing member 113, and the damper rubbers 112 contained in the case 111 are compressed while being clamped between the case 111 and the pressing member 113, whereby a reaction force for returning the case 111 and, hence, the vehicle body frame 16 to the original position (the position in FIG. 8A) is generated.

Figure 9:
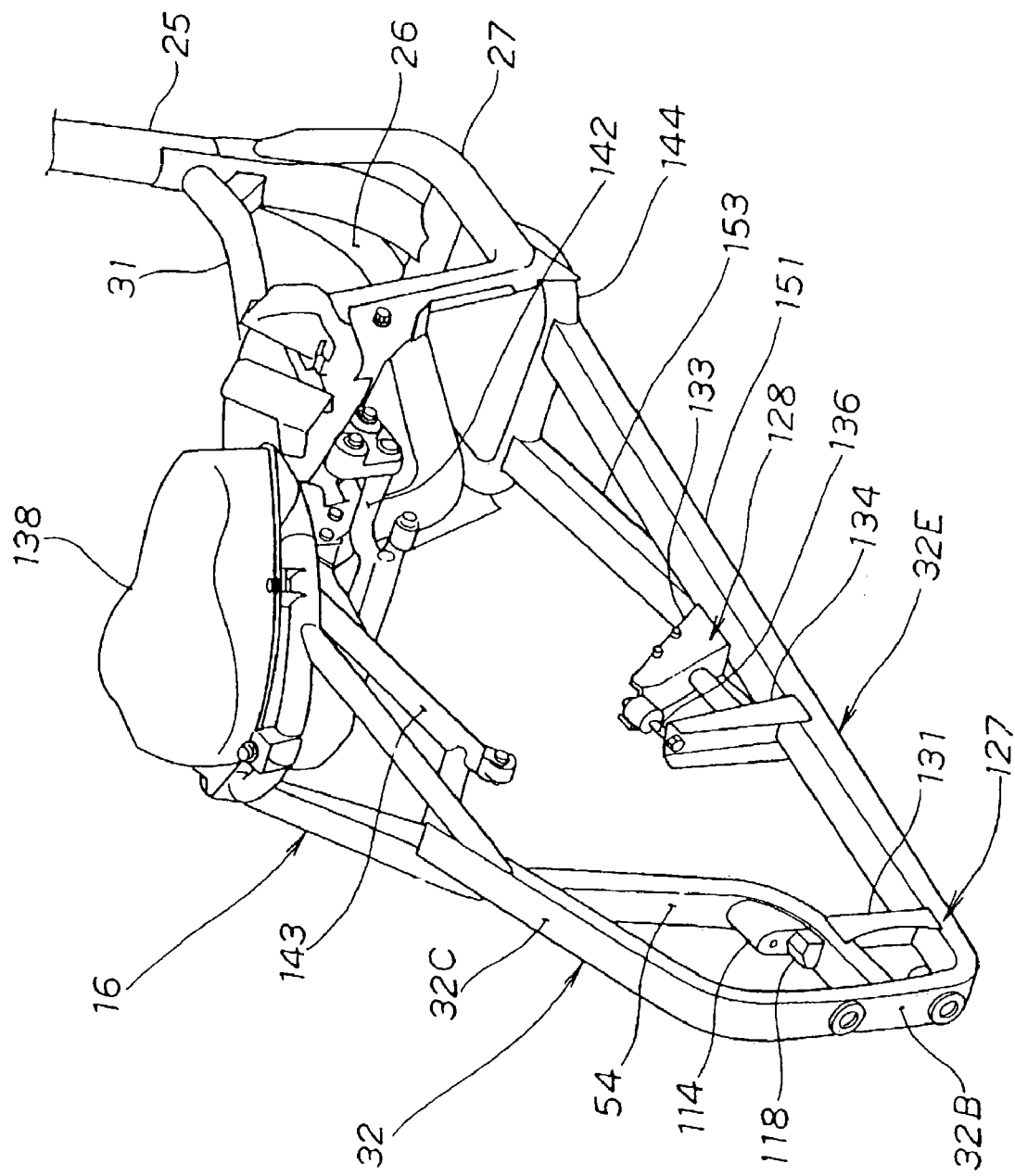
FIG. 9 is a perspective view of the vehicle body frame structure and a structure for mounting portions of suspension arms of the motortricycle according to the first embodiment.

FIG. 9 shows the condition where the J frame 32 is provided with a rear portion mount portion 127 for swingably mounting rear portions of the suspension arms 71 and 72 (see FIG. 7) and a front portion mount portion 128 for swingably mounting front portions of the suspension arms 71 and 72.

The rear portion mount portion 127 is composed of the rear end slant portion 32B, and a vertical bracket 131 extended downward from the L pipe 54 to the lower horizontal portion 32E (described later). The rear portion swing shaft 85 (see FIG. 6) for supporting the rear portions of the suspension arms 71 and 72 is mounted to the rear portion slant portion 32B and the vertical bracket 131.

The front portion mount portion 128 is composed of a front riser portion 133 and a rear riser portion 134, which are raised from the lower horizontal portion 32E with an interval therebetween. A front portion swing shaft 136 for supporting the front portions of the suspension arms 71 and 72 is mounted to the front riser portion 133 and the rear riser portion 134.

Also shown are an oil tank 138, engine mount vibration-isolating links for mounting the engine 34 onto the vehicle body frame 16, and a U-shaped U pipe 144 attached to rear lower portions of the lower pipes 26 and 27 for attaching the tip end of the lower horizontal portion 32E of the J frame 32.

While FIG. 5 shows the embodiment in which the front ends of the lower horizontal portion 32A branched in a Y shape are attached directly to the lower pipes 26 and 27, FIG. 9 shows another embodiment in which the J frame 32 is composed of the lower horizontal portion 32E branched in a Y shape, the rear end slant portion 32B, and the upper slant portion 32C, and the front ends of the lower horizontal portion 32E are attached to the lower pipes 26 and 27 through the U pipe 144.

Figure 10:
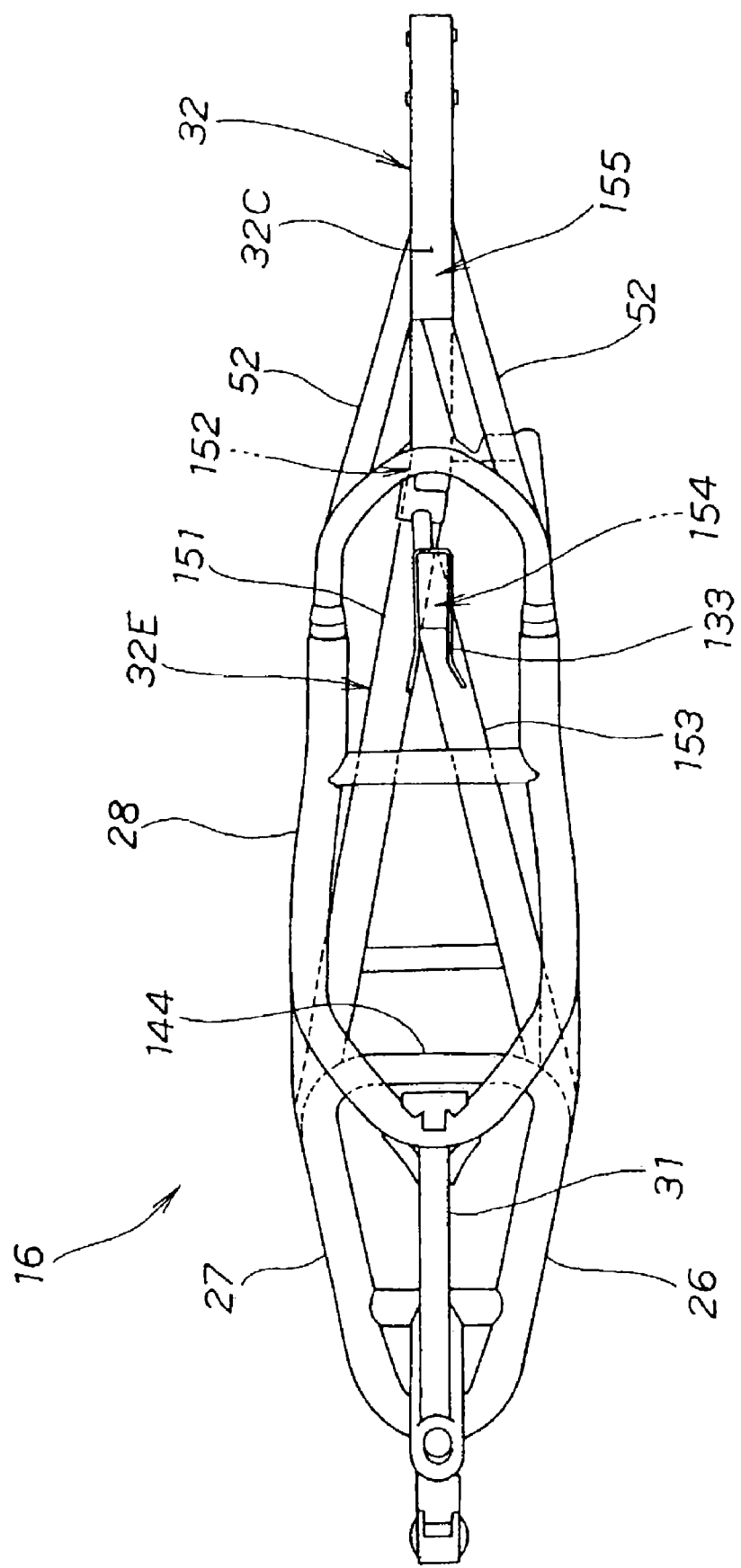
FIG. 10 is a plan view of the vehicle body frame according to the first embodiment.

FIG. 10 shows the condition where the lower horizontal portion 32E of the J frame 32 is branched in a Y form at an intermediate portion thereof and connected to a rear portion of the U pipe 144, and the connection pipes 52, 52 are extended in a Y form from the upper slant portion 32C of the J frame 32 to the center upper frame 28. The U pipe 144 and the center upper frame 28 function as the front frame.

The lower horizontal portion 32E (and the lower horizontal portion 32A (see FIG. 5)), more specifically, is formed by bending a single elongate first pipe 151 at an intermediate portion thereof and connecting a second pipe 153 to a portion near the bent portion 152 of the first pipe 151. A Y-shaped branch portion 154 branches in a Y shape by connecting the second pipe 153 to the first pipe 151, and a Y-shaped branch portion 155 branches in a Y shape by connecting the connection pipes 52, 52 to the upper slant portion 32C.

The first pipe 151 is a member including the rear end slant portion 32B and the upper slant portion 32C, and is a member obtained upon excluding the second pipe 153 from the J frame 32.

Thus, by forming the lower horizontal portion 32E in the Y shape, the connection between a lower front portion of the J frame 32 and the U pipe 144 can be made to be firm, and by disposing the connection pipes 52, 52 in a Y shape, the connection between a rear upper portion of the J frame 32 and a rear portion of the center upper frame 28 can be made to be firm. In addition, in FIG. 5, by forming the lower horizontal portion 32A in the Y shape, the connection between a lower front portion of the J frame 32 and the lower pipes 26 and 27 an be made to be firm.

Figure 11:
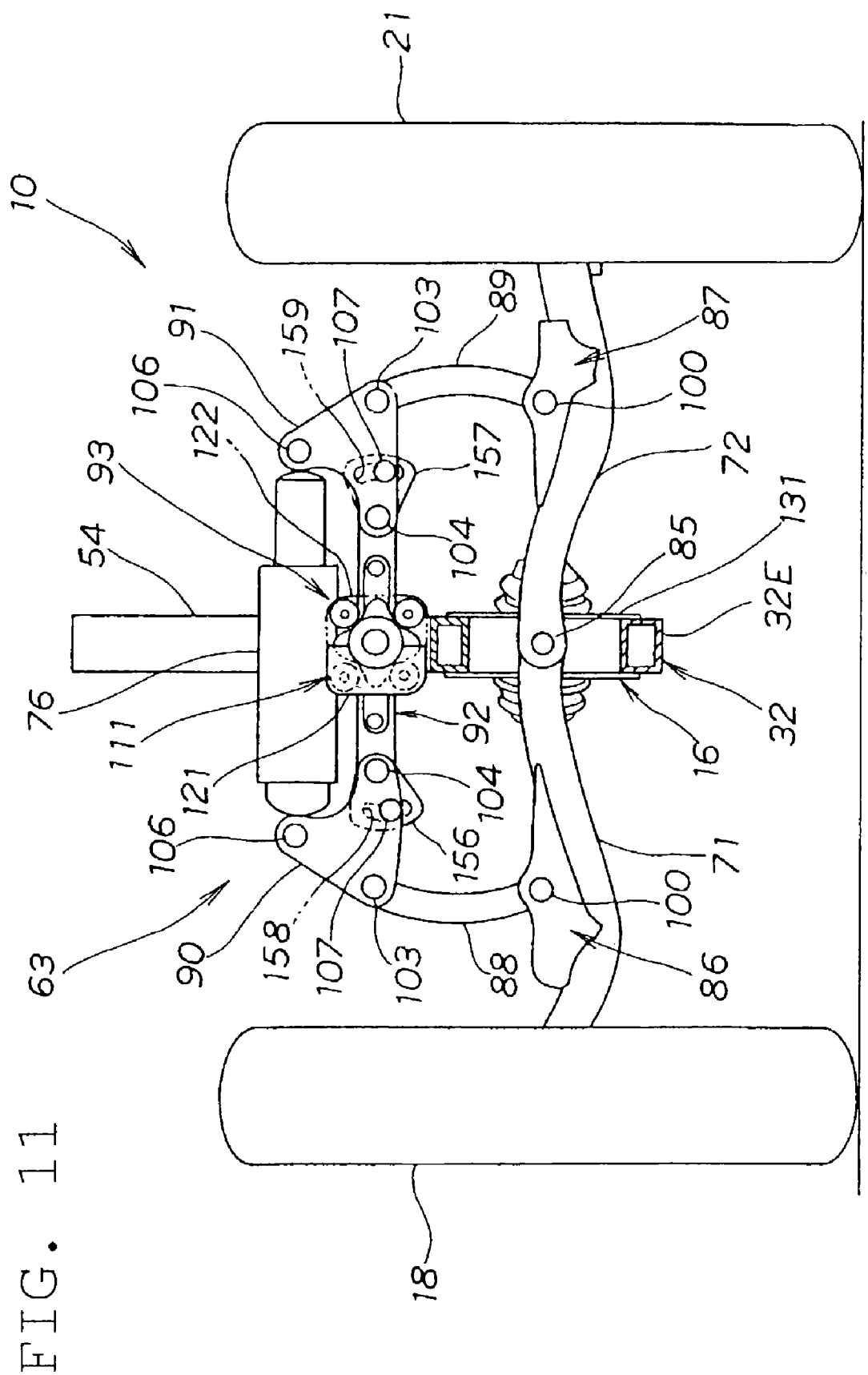
FIG. 11 is a back elevation of a rear suspension according to the first embodiment.

FIG. 11 shows the rear suspension 63 in the condition where one rider (driver) is riding on the vehicle (this condition will be referred to as "1G condition"). Incidentally, the rear slant portion 32B and the upper slant portion 32C of the J frame 32 shown in FIG. 9 are omitted here. The right case 122 of the oscillation mechanism 93 shown in FIG. 8B is indicated by imaginary line. In this case, the L pipe 54 of the vehicle body frame 16 is in a roughly vertical condition, and the connection member 92 is in a roughly horizontal condition.

The connection member 92 includes fan-shaped portions 156 and 157 at both ends thereof, with arcuate slots 158 and 159 provided in the fan-shaped portions 156 and 157 respectively, and fourth bolts 107, 107 as stopper pins are passed through the arcuate slots 158 and 159, whereby the inclination angles of the bell cranks 90 and 91 relative to the connection member 92 are restricted. The inclination angles of the bell cranks 90 and 91 vary according to the inclination angles of the suspension arms 71 and 72, i.e., the vertical movement amounts of the rear wheels 18 and 21. In other words, the arcuate slots 158 and 159 are portions for restricting the vertical movement amounts of the rear wheels 18 and 21.

The functions of the rear suspension 63 described above will be described in FIG. 12.

Figure 12:
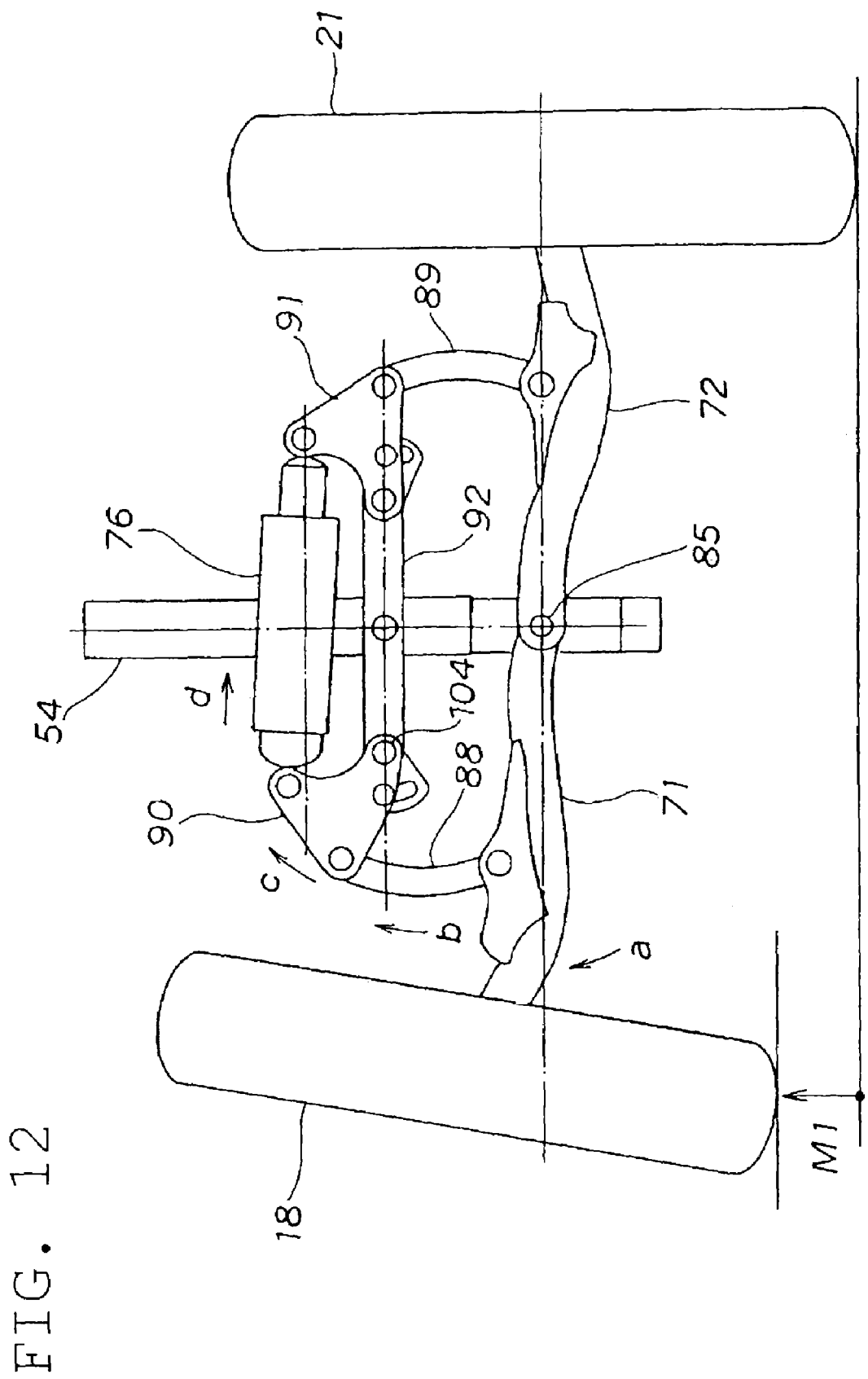
FIG. 12 is a function diagram of the rear suspension when a rear wheel on a left side is moved upward according to the first embodiment.

In FIG. 12, for example, when the rear wheel 18 on the left side is moved upwards by a movement amount M1 from the condition shown in FIG. 11, the suspension arm 71 swings upwards as indicated by arrow a with the rear swing shaft 85 and the front swing shaft 136 (see FIG. 9) as a center. Associated with this, the arcuate link 88 moves upwards as indicated by arrow b to swing the bell crank 90 in the direction of arrow c with the second bolt 104 as a fulcrum, thereby pressing and shrinking the shock absorber 76 as indicated by arrow d. In this manner, transmission of the shock to the side of the vehicle body frame 16 (see FIG. 10) caused by the upward movement of the left-side rear wheel 18 is moderated.

At this time, the suspension arm 72 on the other side is in the same condition as in FIG. 11, so that the connection member 92 is in the same roughly horizontal condition as in FIG. 11.

Figure 13:
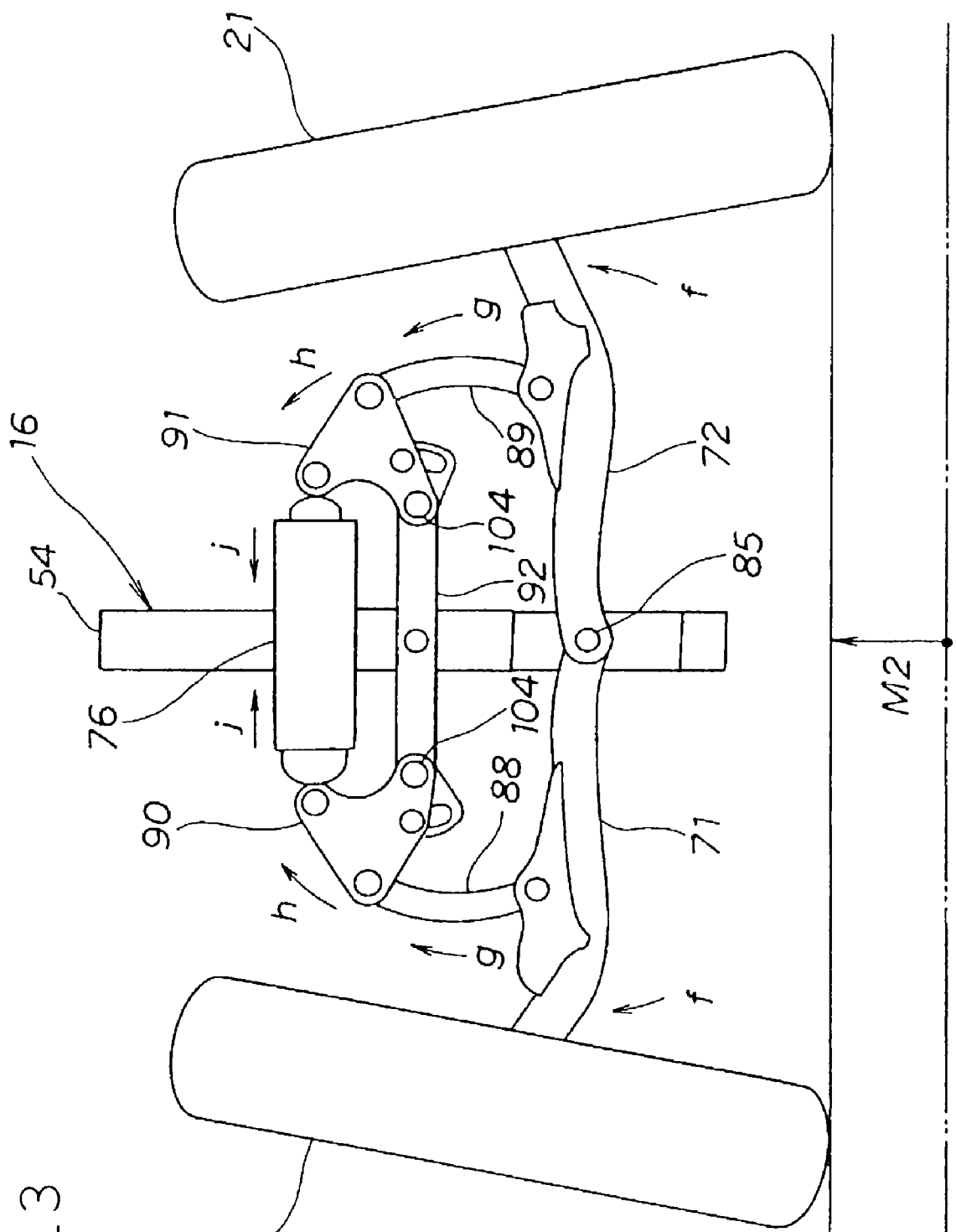
FIG. 13 is a function diagram of the rear suspension when the rear wheels on the right and left sides are both moved upwards according to the first embodiment.

In FIG. 13, when the rear wheels 18 and 21 are both moved upwards by a movement amount M2, or the vehicle body frame 16 is lowered by the movement amount M2 relative to the rear wheels 18 and 21, from the condition of FIG. 11, the suspension arms 71 and 72 swing upwards about the rear swing shaft 85 and the front swing shaft 136 (see FIG. 9) as indicated by arrows f, f. Associated with this, the arcuate links 88 and 89 move upwards as indicated by arrows g, g to swing the bell cranks 90 and 91 in the directions of arrows h, h with the second bolt 104 as a fulcrum, thereby pressing and shrinking the shock absorber 76 as indicated by arrows j, j. As a result, a shock-absorbing function of the shock absorber 76 takes place.

Figure 14:
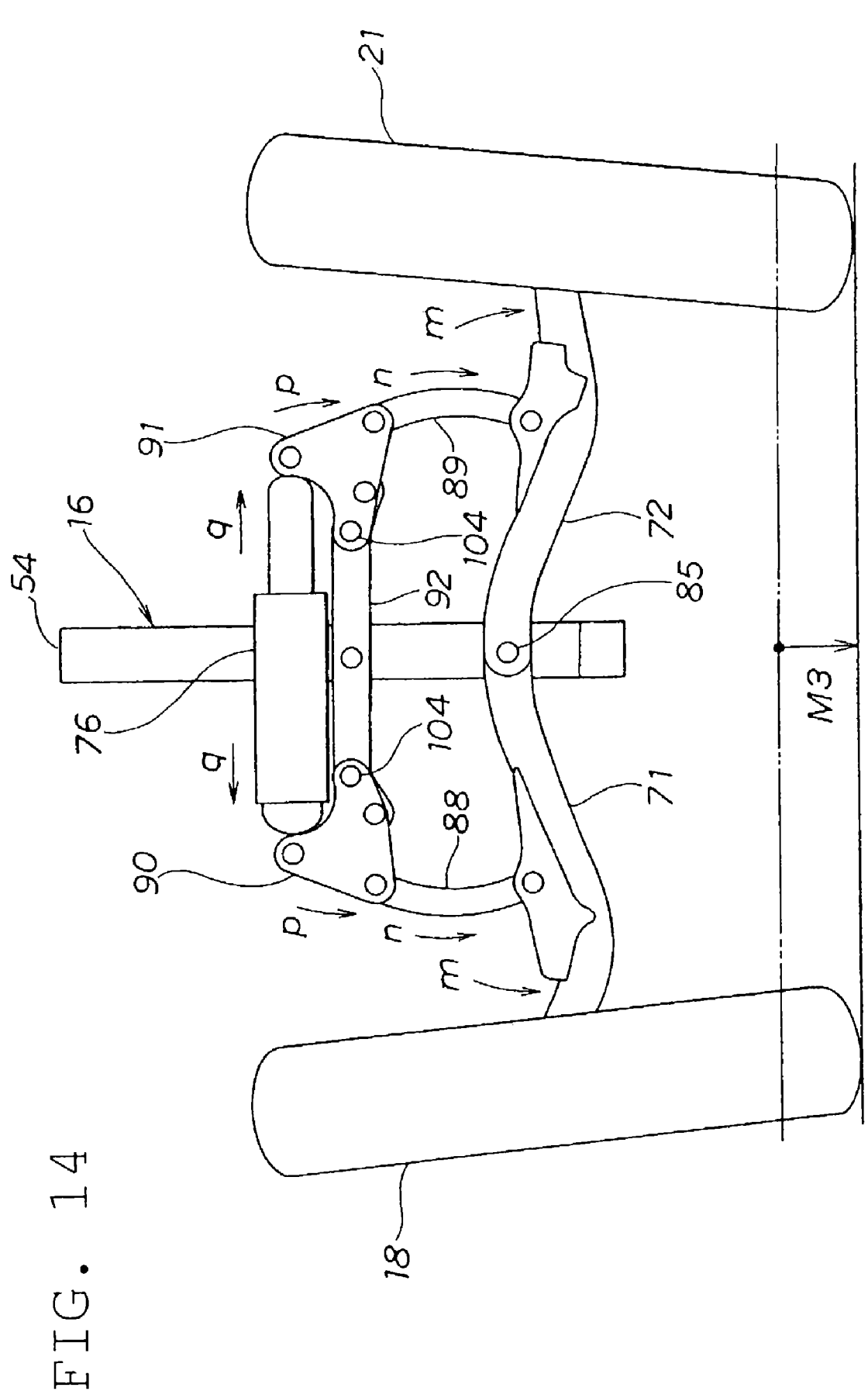
FIG. 14 is a function diagram of the rear suspension when the rear wheels on the right and left sides are both lowered according to the first embodiment.

In FIG. 14, when the rear wheels 18 and 21 are both lowered by a movement amount M3, or the vehicle body frame 16 is moved upwards by the movement amount M3 relative to the rear wheels 18 and 21, from the condition of FIG. 11, the suspension arms 71 and 72 swing downwards as indicated by arrows m, m with the rear swing shaft 85 and the front swing shaft 136 (see FIG. 9) as a center. Associated with this, the arcuate links 88 and 89 are lowered as indicated by arrows n, n to swing the bell cranks 90 and 91 in the directions of arrows p, p with the second bolt 104 as a fulcrum, thereby stretching the shock absorber 76 as indicated by arrows q, q. As a result, a shock-absorbing function of the shock absorber 76 takes place.

Figure 15:
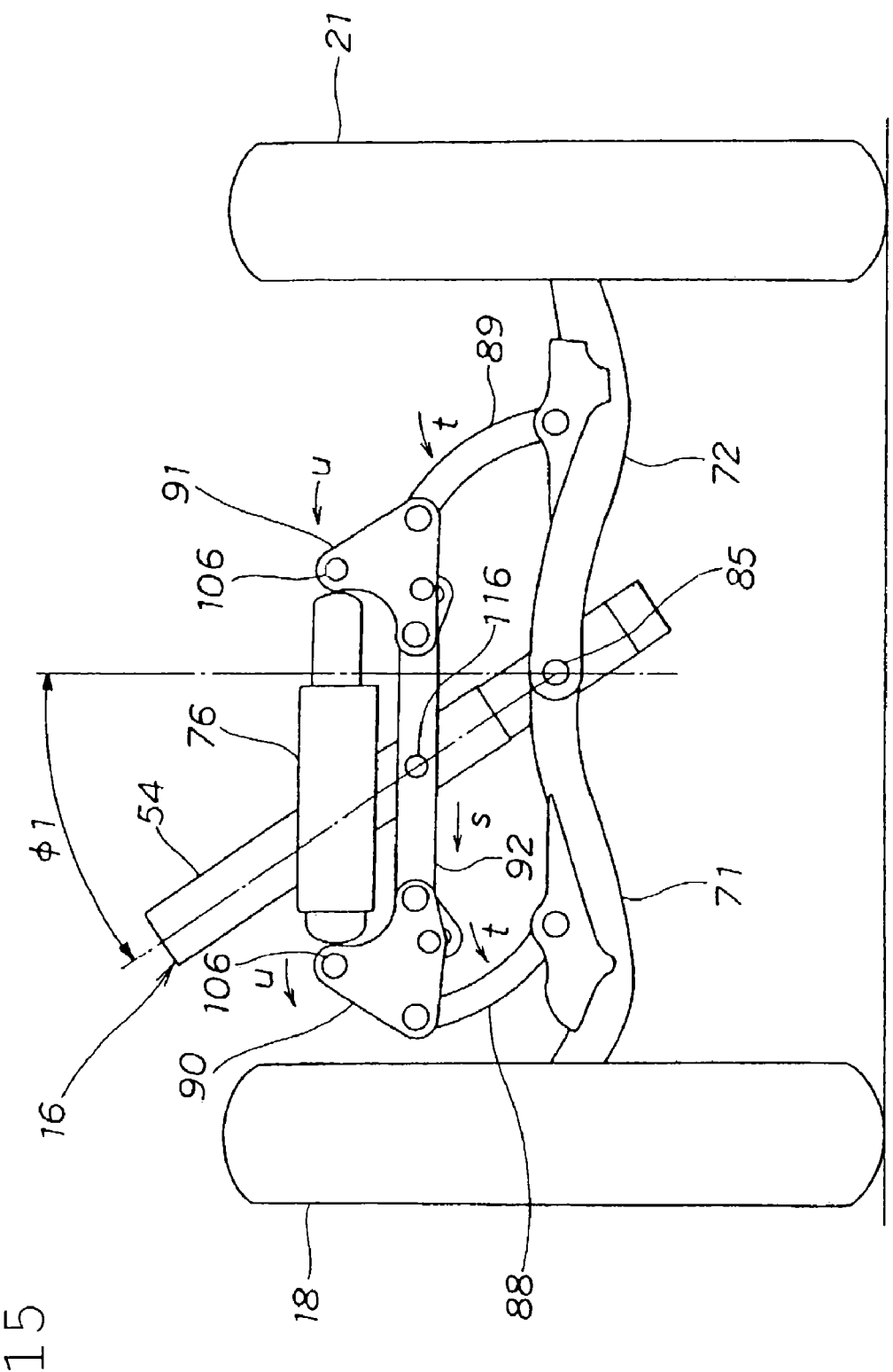
FIG. 15 is a function diagram of the rear suspension when an upper portion of vehicle body frame is oscillated to a left side of the vehicle body frame according to the first embodiment.

In FIG. 15, when the vehicle body frame 16, here the L pipe 54, is oscillated by an angle φ 1 (phi 1) to the left side of the vehicle body from the condition of FIG. 11, the connection member 92 connected to the L pipe 54 through the penetrating pin 116 undergoes a parallel movement to the left side as indicated by arrow s. Associated with this, the arcuate links 88 and 89 are inclined as indicated by arrows t, t, and the bell cranks 90 and 91 undergo a parallel movement as indicated by arrows u, u. In this case, since the distance between the third bolts 106, 106 of the bell cranks 90 and 91 remains unchanged, the shock absorber 76 is not stretched nor shrunk.

At this time, since the vehicle body frame 16 oscillates relative to the connection member 92, the oscillation mechanism generates a reaction force for returning the vehicle body frame 16 to its original position (namely, the position in FIG. 11), in the same manner as in the case shown in FIG. 8C.

Figure 16:
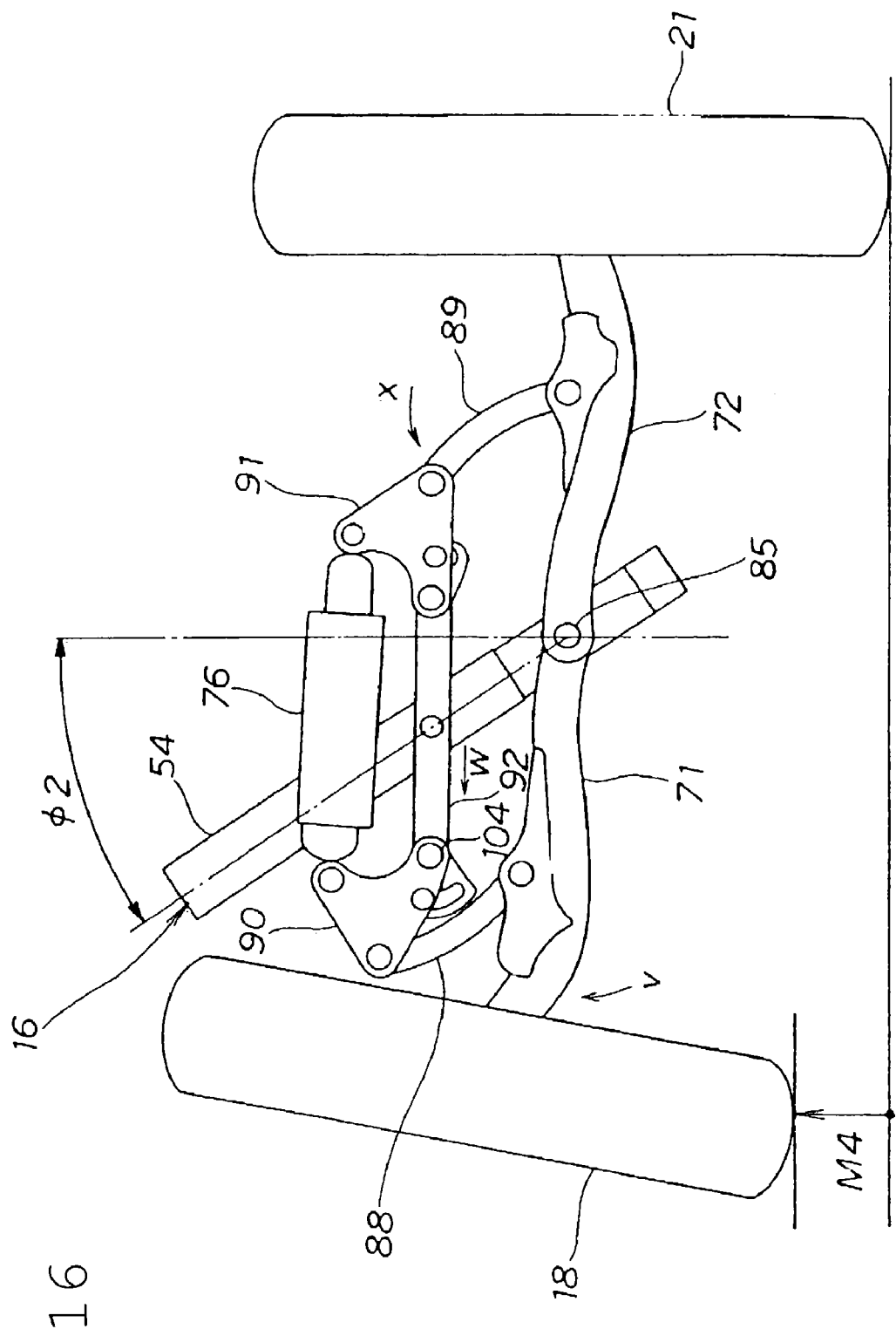
FIG. 16 is a function diagram of the rear suspension when the rear wheel on the left side is moved upwards and the upper portion of the vehicle body frame is oscillated to the left side of the vehicle body according to the first embodiment.

In FIG. 16, when the rear wheel 18 is moved upwards by a movement amount M4 and the vehicle body frame 16, here the L pipe 54, is oscillated by an angle φ 2 (phi 2) to the left side of the vehicle body from the condition of FIG. 11, the suspension arm 71 swings upwards as indicated by arrow v with the rear swing shaft 85 and the front swing shaft 136 (see FIG. 9) as a center, and the connection member 92 is moved leftwards as indicated by arrow w. Associated with this, the arcuate link 88 is moved upwards and inclined to the left side, the arcuate link 89 is inclined to the left side as indicated by arrow x, the bell crank 90 swings clockwise with the second bolt 104 as a fulcrum and is moved leftwards, and the bell crank 91 is moved leftwards, resulting in that the shock absorber 76 is pressed and shrunk, to display a shock-absorbing function.

Figure 17:
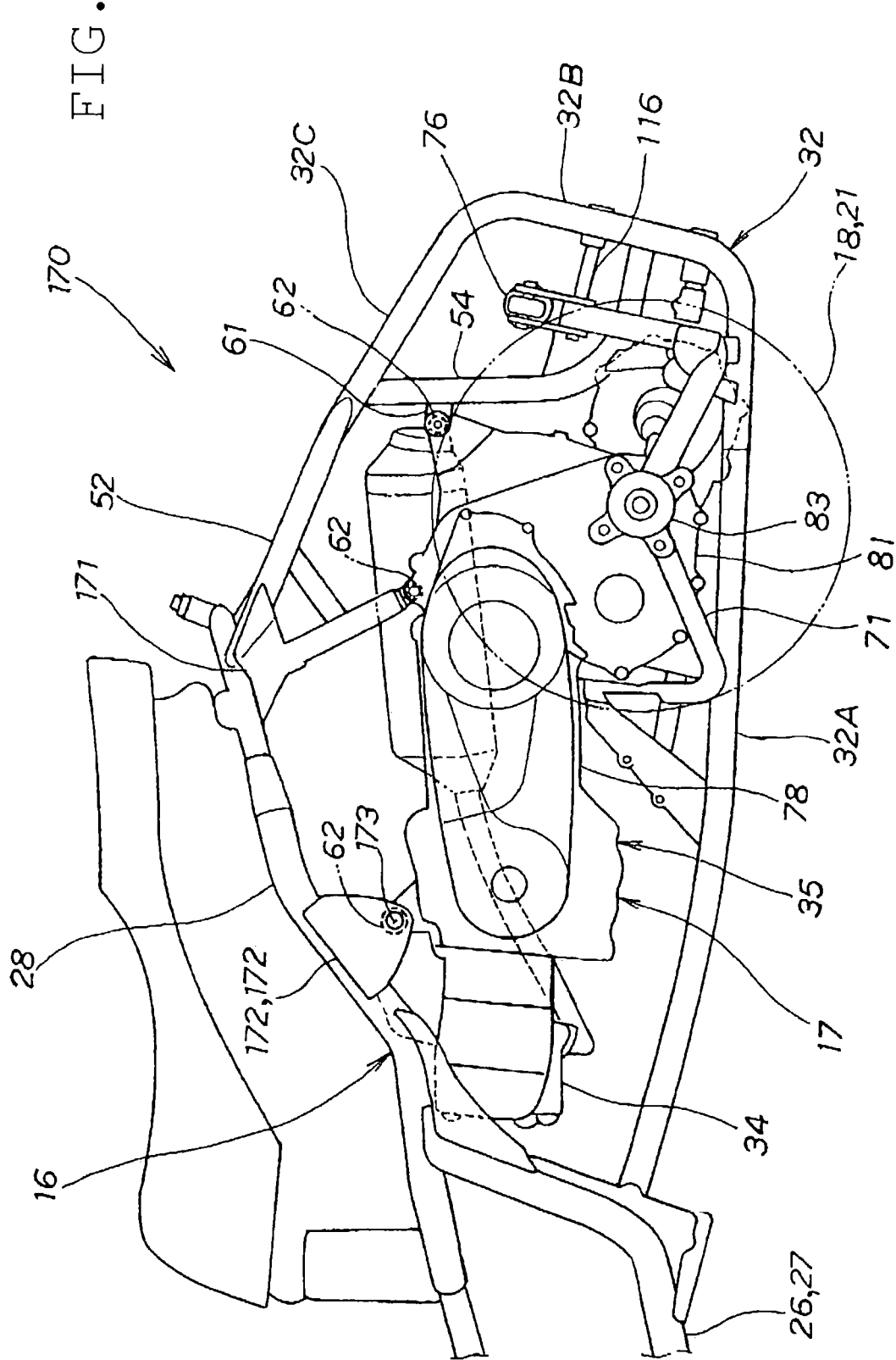
FIG. 17 is a side view of an essential part of the motortricycle with oscillation mechanism according to the second embodiment.
Figure 18:
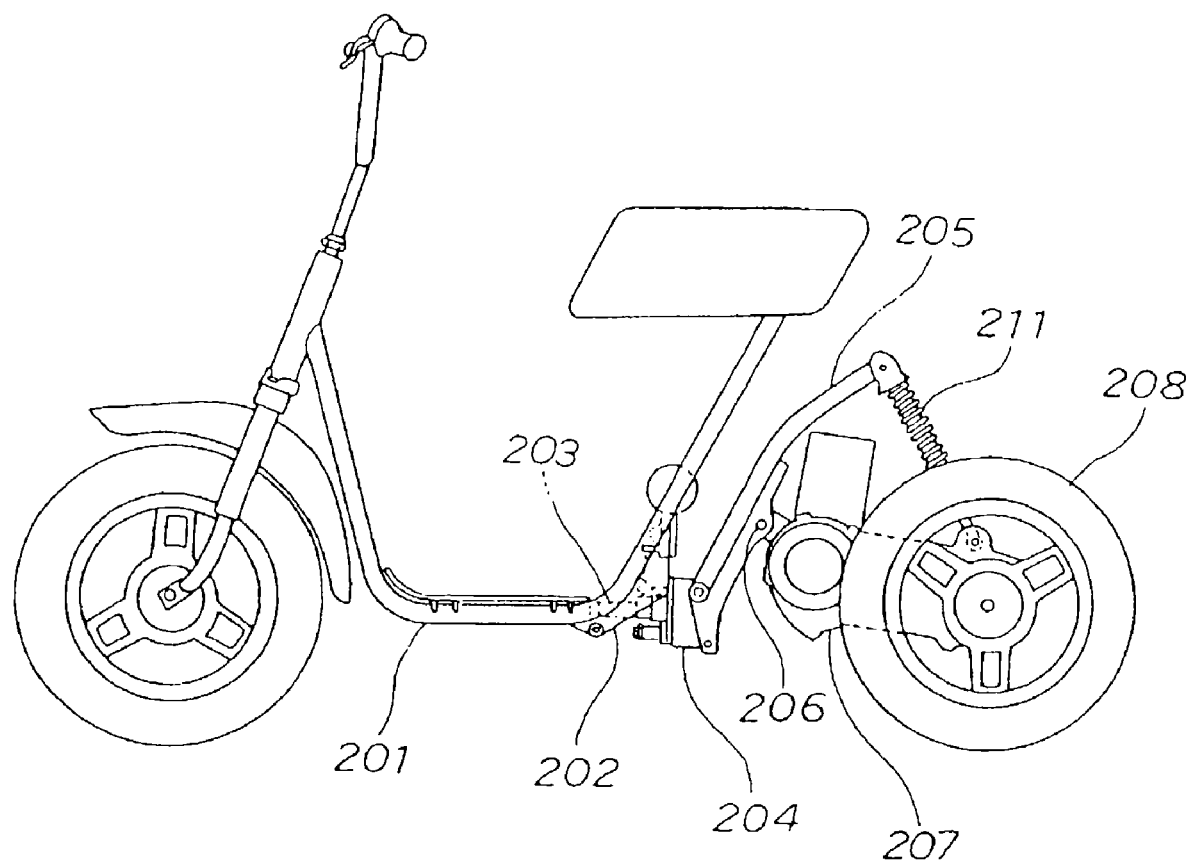
FIG. 18 is a side view of a motortricycle with oscillation mechanism according to the background art.
Figure 19:
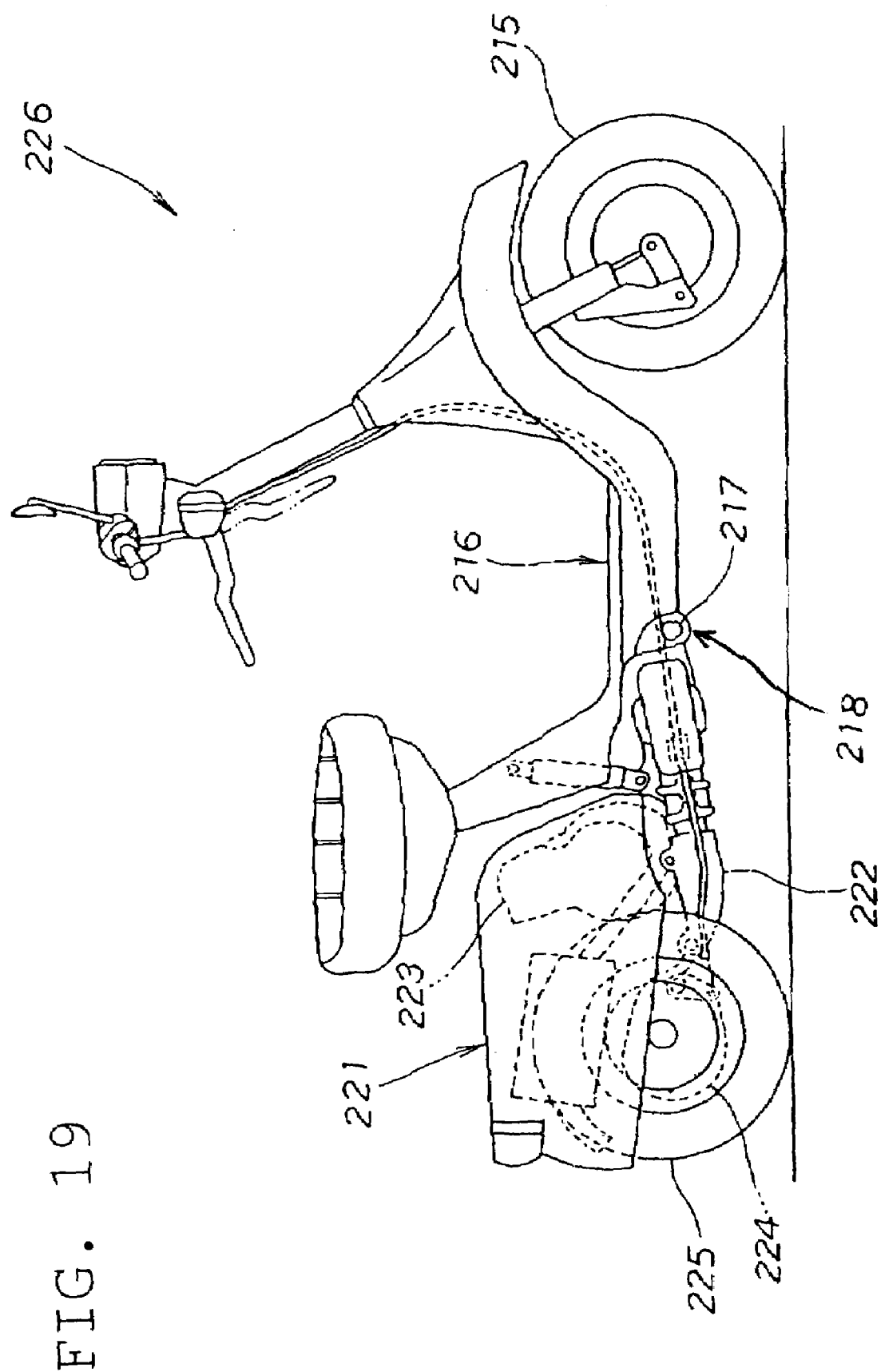
FIG. 19 is another side view of the motortricycle with the oscillation mechanism according to the background art.
Figure 20:
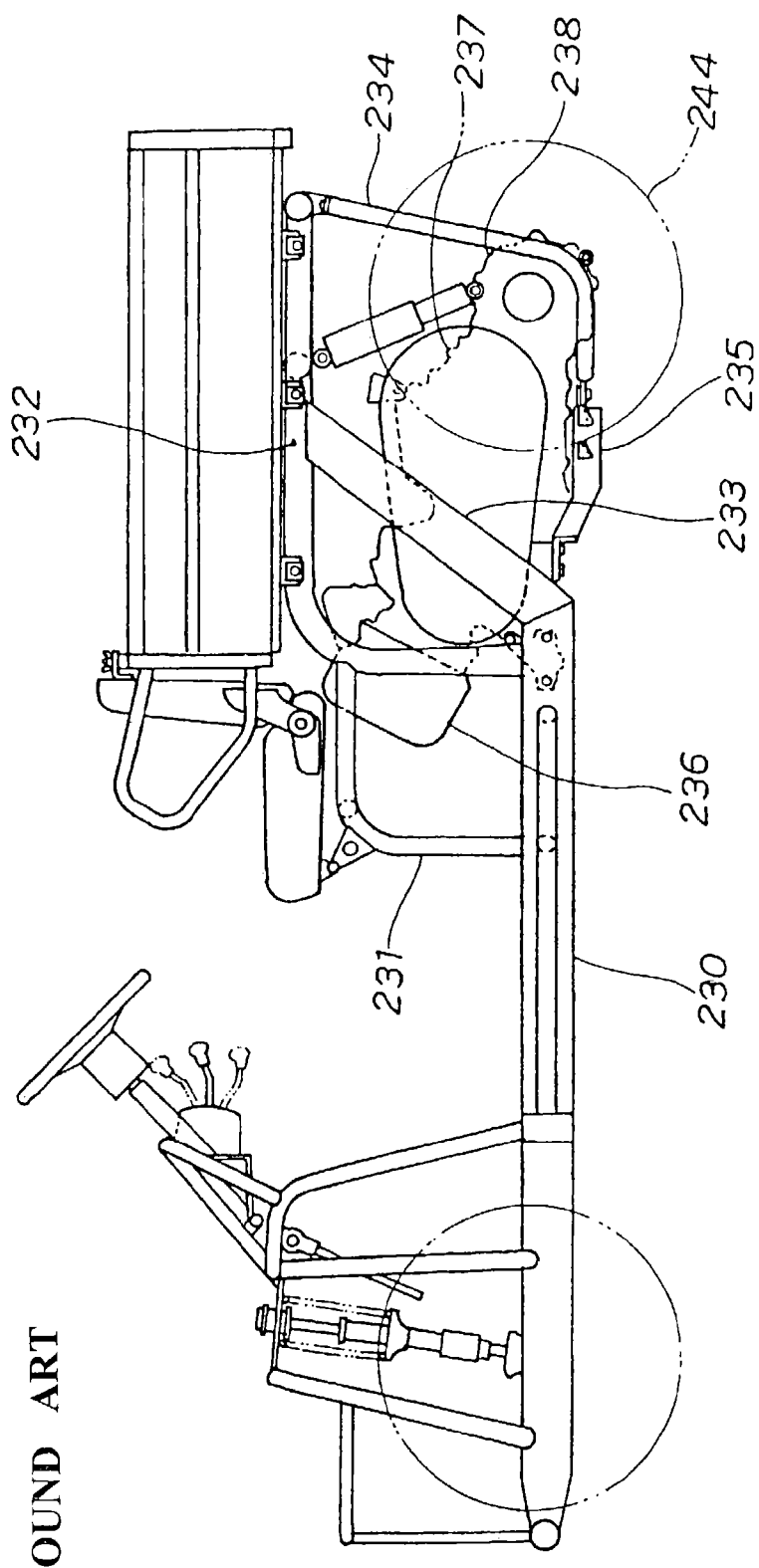
FIG. 20 is a side view showing a vehicle body frame of a vehicle according to the background art.
Figure 21:
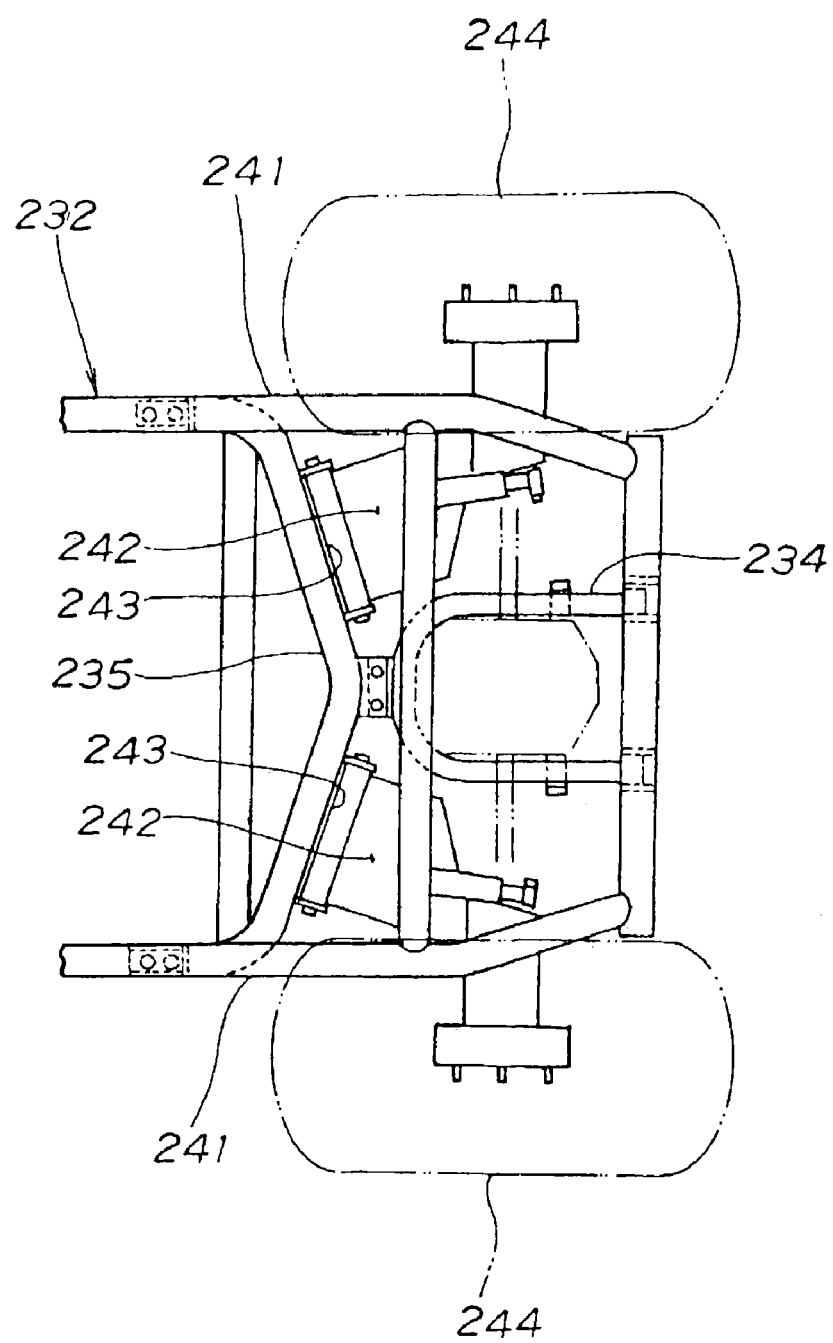
FIG. 21 is a plan view of an essential part of the vehicle body frame of the vehicle according to the background art.

As shown in FIG. 17, the same components as those in the embodiment shown in FIG. 2 are denoted by the same symbols as used above, and detailed descriptions thereof are omitted.

The motortricycle with oscillation mechanism 170 is a vehicle in which a rear bracket 171 for reinforcing the connection portions between the connection pipes 52, 52 and the center upper frame 28 and for supporting a rear upper portion of the power unit 17 is attached to the connection pipes 52, 52 and the center upper frame 28, and left and right front brackets 172, 172 for supporting a front upper portion of the power unit 17 are attached to the center upper frame 28.

The front upper portion of the power unit 17 is a portion that is rubber-mounted on the front brackets 172, 172. Namely, the front upper portion of the power unit 17 is connected to the front brackets 172, 172 through a support shaft 173 and the rubber bush 62 provided in the periphery of the support shaft 173.

In addition, the rear upper portion of the power unit 17 is also a portion, which is rubber-mounted on the rear bracket 171 through the rubber bush 62.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motortricycle with an oscillation mechanism, comprising:
   a rear suspension having left and right suspension arms respectively swingably mounted onto a vehicle body frame;
   right and left rear wheels mounted respectively onto outer portions of said left and right suspension arms;

an oscillation mechanism permitting leftward and rightward oscillation of said vehicle body frame relative to the rear suspension, the oscillation mechanism being provided between said suspension arms and said vehicle body frame, the oscillation mechanism adapted to absorb leftward and rightward oscillation of the vehicle body frame; a shock absorber provided between said right and left suspension arms, the shock absorber adapted to absorb vertical movement of the rear wheels; and an engine for driving said left and right rear wheels supported on said vehicle body frame, wherein said engine is capable of oscillating together with said vehicle body frame.

2. The motortricycle with an oscillation mechanism as set forth in claim 1, wherein said engine is supported on said vehicle body frame through a rubber mount.

3. The motortricycle with an oscillation mechanism as set forth in claim 1, wherein said engine is supported on said vehicle body frame through a plurality of links.

4. The motortricycle with an oscillation mechanism as set forth in claim 1, said vehicle body frame surrounds front and rear sides and upper and lower sides of said engine, and at least a rear portion of said vehicle body frame is comprised of a single pipe.

5. The motortricycle with an oscillation mechanism as set forth in claim 4, wherein said single pipe is J-shaped.

6. The motortricycle with an oscillation mechanism as set forth in claim 4, wherein said single pipe of said rear portion is connected to a center upper frame through a pair of connection pipes on the upper side of said engine.

7. The motortricycle with an oscillation mechanism as set forth in claim 4, wherein said single pipe of said rear portion is connected to a front frame through a Y-shaped branched portion on the lower side of said engine.

8. The motortricycle with an oscillating mechanism as set forth in claim 7, wherein said single pipe of said rear portion is connected to lower pipes of a front frame through the Y-shaped branched portion and a U pipe.

9. The motortricycle with an oscillation mechanism as set forth in claim 1, wherein an upper front side of said engine is oscillatably mounted on a center upper frame portion of the motortricycle vehicle body frame via a relay member 10. A motortricycle with an oscillation mechanism comprising, a rear suspension having left and right suspension arms respectively swingably mounted onto a vehicle body frame;

rear wheels mounted respectively onto outer portions of said left and right suspension arms;

an oscillation mechanism permitting leftward and rightward oscillation of said vehicle body frame relative to the rear suspension, the oscillation mechanism being provided between said suspension arms and said vehicle body frame; and an engine for driving said left and right rear wheels supported on said vehicle body frame, wherein said engine is capable of oscillating together with said vehicle body frame, said vehicle body frame surrounds front and rear sides and upper and lower sides of said engine, and at least a rear portion of said vehicle body frame is comprised of a single pipe, wherein said single pipe of said rear portion is connected to a center upper frame through a Y-shaped branched portion on the upper side of said engine.

11. An engine support structure and a vehicle body frame support structure for supporting the engine, comprising:

left and right suspension arms respectively swingably mounted onto a vehicle body frame;

rear wheels mounted respectively onto outer portions of said left and right suspension arms;

an oscillation mechanism permitting leftward and rightward oscillation of said vehicle body frame relative to said suspension arms, the oscillation mechanism being provided between said suspension arms and said vehicle body frame; and an engine for driving said left and right rear wheels mounted onto said vehicle body frame, wherein said engine is capable of oscillating together with said vehicle body frame, wherein the vehicle body frame surrounds front and rear sides and upper and lower sides of the oscillation mechanism, the suspension arms, and the engine in side view.

12. The engine support structure and a vehicle frame support structure for supporting the engine as set forth in claim 11, wherein said engine is supported on said vehicle body frame through a rubber mount.

13. The engine support structure and a vehicle body frame support structure for supporting the engine as set forth in claim 11, wherein said engine is supported on said vehicle body frame through a plurality of links, wherein at least one of the links has a different length.

14. The engine support structure and a vehicle body frame support structure for supporting the engine as set forth in claim 11, wherein at least a rear portion of said vehicle body frame is comprised of a single pipe.

15. The engine support structure and a vehicle body frame support structure for supporting the engine as set forth in claim 14, wherein said single pipe is J-shaped.

16. The engine support structure and a vehicle body frame support structure for supporting the engine as set forth in claim 14, wherein said single pipe of said rear portion is connected to a center upper frame through a pair of connection pipes on the upper side of said engine.

17. The engine support structure and a vehicle body frame support structure for supporting the engine as set forth in claim 14, wherein said single pipe of said rear portion is connected to a front frame through a Y-shaped branched portion on the lower side of said engine.

18. The engine support structure and a vehicle body frame support structure for supporting the engine as set forth in claim 17, wherein said single pipe of said rear portion is connected to lower pipes of a front frame through the Y-shaped branched portion and a U pipe.

19. The engine support structure and a vehicle body frame support structure for supporting the engine as set forth in claim 14, wherein said single pipe of said rear portion is connected to a front frame through a Y-shaped branched portion on the upper side of said engine.

20. The engine support structure and a vehicle body frame support structure for supporting the engine as set forth in claim 11, wherein an upper front side of said engine is oscillatably mounted on a center upper frame portion of the vehicle body frame via a relay member.

* * * * *